United States Patent
Krishnakumar et al.

(10) Patent No.: US 11,450,159 B2
(45) Date of Patent: Sep. 20, 2022

(54) CONTROLLING A STATE OF A SHUTTER OF A CAMERA MODULE OF AN INFORMATION HANDLING SYSTEM

(71) Applicant: Dell Products L.P., Round Rock, TX (US)

(72) Inventors: Karthikeyan Krishnakumar, Austin, TX (US); Hin Loong Wong, Singapore (SG)

(73) Assignee: Dell Products L.P., Round Rock, TX (US)

( * ) Notice: Subject to any disclaimer, the term of this patent is extended or adjusted under 35 U.S.C. 154(b) by 99 days.

(21) Appl. No.: 17/144,907

(22) Filed: Jan. 8, 2021

(65) Prior Publication Data

US 2022/0222987 A1      Jul. 14, 2022

(51) Int. Cl.
*G02B 13/16* (2006.01)
*H04N 5/225* (2006.01)
*G07C 9/00* (2020.01)
*H04N 5/232* (2006.01)

(52) U.S. Cl.
CPC ........ *G07C 9/00182* (2013.01); *H04N 5/232* (2013.01)

(58) Field of Classification Search
CPC ............................ G07C 9/00182; H04N 5/232
USPC ......................................................... 348/335
See application file for complete search history.

(56) References Cited

U.S. PATENT DOCUMENTS

2018/0298636 A1* 10/2018 Minnich ................ E05B 77/34

\* cited by examiner

*Primary Examiner* — Stephen P Coleman
(74) *Attorney, Agent, or Firm* — Baker Botts, L.L.P.

(57) ABSTRACT

Controlling states of a shutter, including receiving a signal indicating to adjust a shutter of a camera from an open state to a closed state; in response to the signal, mechanically adjusting the shutter of the camera module from the open state to the closed state; after adjusting the state of the shutter of the camera module from the open state to the closed state, receiving a signal indicating that a state of a pin indicates that a lock latch is engaged with the shutter to mechanically interfere with movement of the shutter from the closed state to the open state; detecting an attempt to adjust the state of the shutter of the camera module to the open state from the closed state, and in response, preventing mechanical adjustment of the state of the shutter of the camera module to the open state from the closed state.

20 Claims, 24 Drawing Sheets

CONTROLLING A STATE OF A SHUTTER OF A CAMERA MODULE OF AN INFORMATION HANDLING SYSTEM

BACKGROUND

Field Of The Disclosure

The disclosure relates generally to an information handling system, and in particular, controlling a state of a shutter of a camera module of the information handling system.

Description Of The Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Users' fear of intrusion into their privacy has seen a certain number of visual blocker solutions on integrated cameras or externally mounted webcam such as stickers, or web cam covers to visually block the camera lens.

SUMMARY

Innovative aspects of the subject matter described in this specification may be embodied in a method of controlling states of a shutter, the method including receiving a signal indicating to adjust a shutter of a camera module of an information handling system from an open state to a closed state to prevent access to a camera of the camera module; in response to the signal, mechanically adjusting the shutter of the camera module from the open state to the closed state; after adjusting the state of the shutter of the camera module from the open state to the closed state, receiving a signal indicating that a state of a pin indicates that a lock latch is engaged with the shutter to mechanically interfere with movement of the shutter from the closed state to the open state, the pin in contact with the shutter; detecting an attempt to adjust the state of the shutter of the camera module to the open state from the closed state while the lock latch is engaged with the shutter; in response to detecting the attempt to adjust the state of the shutter of the camera module to the open state from the closed state while the lock latch is engaged with the shutter and based on the state of the pin, preventing mechanical adjustment of the state of the shutter of the camera module to the open state from the closed state.

Other embodiments of these aspects include corresponding systems, apparatus, and computer programs, configured to perform the actions of the methods, encoded on computer storage devices.

These and other embodiments may each optionally include one or more of the following features. For instance, in response to detecting the attempt to adjust the state of the shutter of the camera module to the open state from the closed state while the lock latch is engaged with the shutter: providing a notification to a display device of the information handling system indicating the attempt to adjust the state of the shutter of the camera module to the open state from the closed state. Receiving the signal indicating to adjust the shutter of the camera module further comprises receiving the signal from a computer-implemented application executing on the information handling system. Receiving the signal indicating to adjust the shutter of the camera module further comprises receiving the signal in response to a keypress of a keyboard input device of the information handling system. The attempt to adjust the state of the shutter of the camera module to the open state from the closed state while the lock latch is engaged with the shutter includes an unauthorized attempt to adjust the state of the shutter of the camera module to the open state from the closed state while the lock latch is engaged with the shutter from an authorized source. Mechanically adjusting the shutter of the camera module from the open state to the closed state further comprises: providing a signal to a motor to mechanically adjust a positioning of the shutter within the camera module from the open state to the closed state; receiving a signal from a sensor detecting a positioning of the shutter within the camera module to indicate that the shutter is in the closed state; and in response to the signal from the sensor detecting the positioning of the shutter within the camera module to indicate that the shutter is in the closed state, providing a signal to the motor to cease adjusting the positioning of the shutter with the camera module. Receiving a signal indicating to adjust the shutter of the camera module of the information handling system from the closed state to the open state to provide access to the camera module; determining that the state of the pin indicates that the lock latch is disengaged from the shutter; and in response to determining that the state of the pin indicates that the lock latch is disengaged with the shutter, mechanically adjusting the shutter of the camera module from the closed state to the open state.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
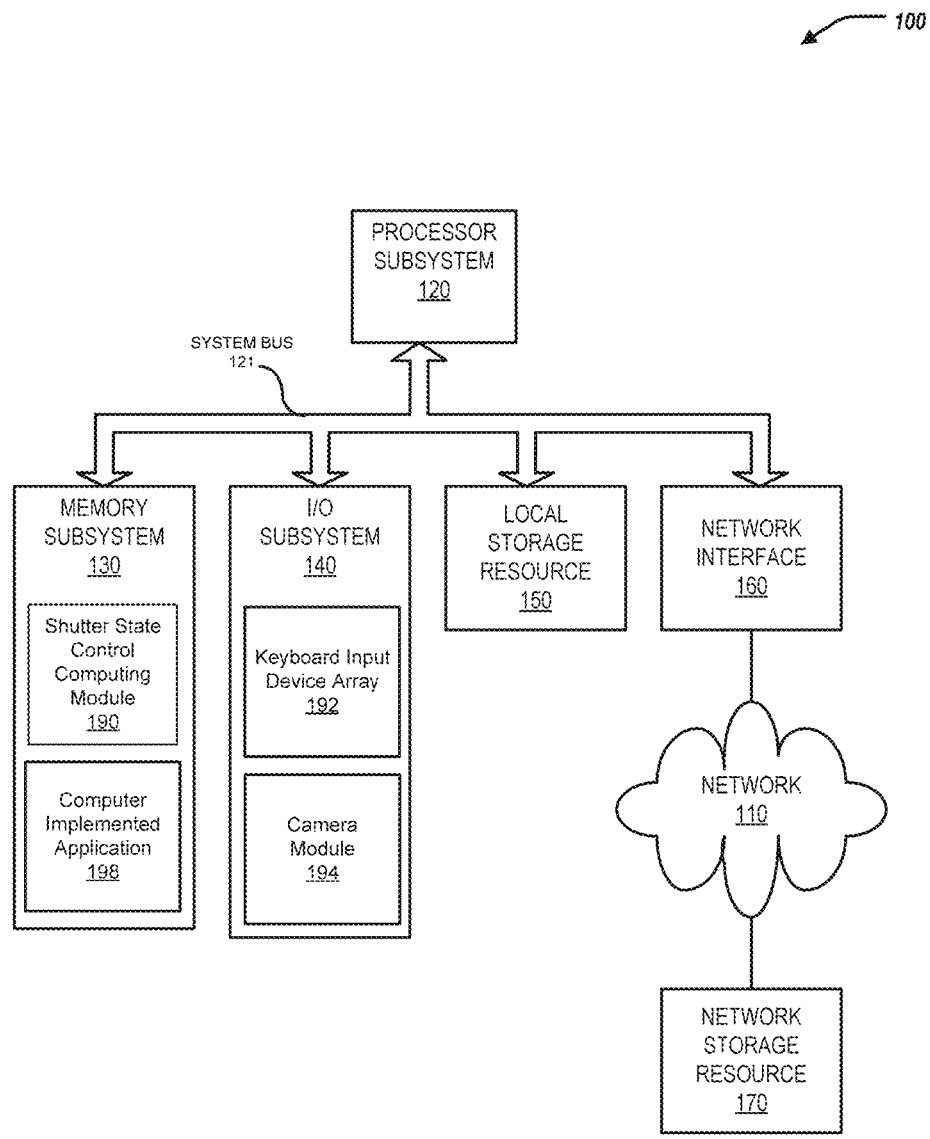
FIG. 1 is a block diagram of selected elements of an embodiment of an information handling system.

This disclosure discusses methods and systems for controlling a state of a shutter of a camera module of the information handling system. In short, a shutter state control computing module can facilitate prevention of unauthorized access to a camera module. A lock latch can mechanically interfere with a shutter of the camera module. When the lock latch is engaged with the shutter of the camera module, the lock latch prevents translation of the shutter from a closed position to an open position. Additionally, when the lock latch is engaged with the shutter of the camera module, the lock latch can set a state of a pin/switch that is in communication with the shutter state control computing module to indicate that the lock latch is engaged with the shutter, setting an additional prevention technique to access to the camera module, described further herein. Furthermore, when the lock latch is disengaged from the shutter of the camera module, an interference between the lock latch and the shutter at the open position can additionally prevent translation of the lock latch.

Specifically, this disclosure discusses a system and a method for controlling states of a shutter, the method including receiving a signal indicating to adjust a shutter of a camera module of an information handling system from an open state to a closed state to prevent access to a camera of the camera module; in response to the signal, mechanically adjusting the shutter of the camera module from the open state to the closed state; after adjusting the state of the shutter of the camera module from the open state to the closed state, receiving a signal indicating that a state of a pin indicates that a lock latch is engaged with the shutter to mechanically interfere with movement of the shutter from the closed state to the open state, the pin in contact with the shutter; detecting an attempt to adjust the state of the shutter of the camera module to the open state from the closed state while the lock latch is engaged with the shutter; in response to detecting the attempt to adjust the state of the shutter of the camera module to the open state from the closed state while the lock latch is engaged with the shutter: determining that the state of the pin indicates that the lock latch is engaged with the shutter; and in response to determining that the state of the pin indicates that the lock latch is engaged with the shutter, preventing mechanical adjustment of the state of the shutter of the camera module to the open state from the closed state while the lock latch remains engaged with the shutter to mechanically interfere with movement of the shutter from the closed state to the open state.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-16 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device. For example, the I/O subsystem 140 can include a keyboard input device 192 and a camera module 194.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can also include a shutter state control computing module 190. The shutter state control computing module 190 can be included by the memory subsystem 130. The shutter state control computing module 190 can include a computer-executable program (software). The shutter state control computing module 190 can be executed by the processor subsystem 120.

The information handling system 100 can also include a computer-implemented application 198. The computer-implemented application 198 can be included by the memory subsystem 130. The computer-implemented application 198 can include a computer-executable program (software). The computer-implemented application 198 can be executed by the processor subsystem 120.

In short, the shutter state control computing module 190 can facilitate prevention of unauthorized access to the camera module 194. A lock latch can mechanically interfere with a shutter of the camera module 194. When the lock latch is engaged with the shutter of the camera module 194, the lock latch prevents translation of the shutter from a closed position to an open position. Additionally, when the lock latch is engaged with the shutter of the camera module 194, the lock latch can set a state of a pin/switch that is in communication with the shutter state control computing module 190 to indicate that the lock latch is engaged with the shutter, setting an additional prevention technique to access to the camera module 194, described further herein.

Figure 2:
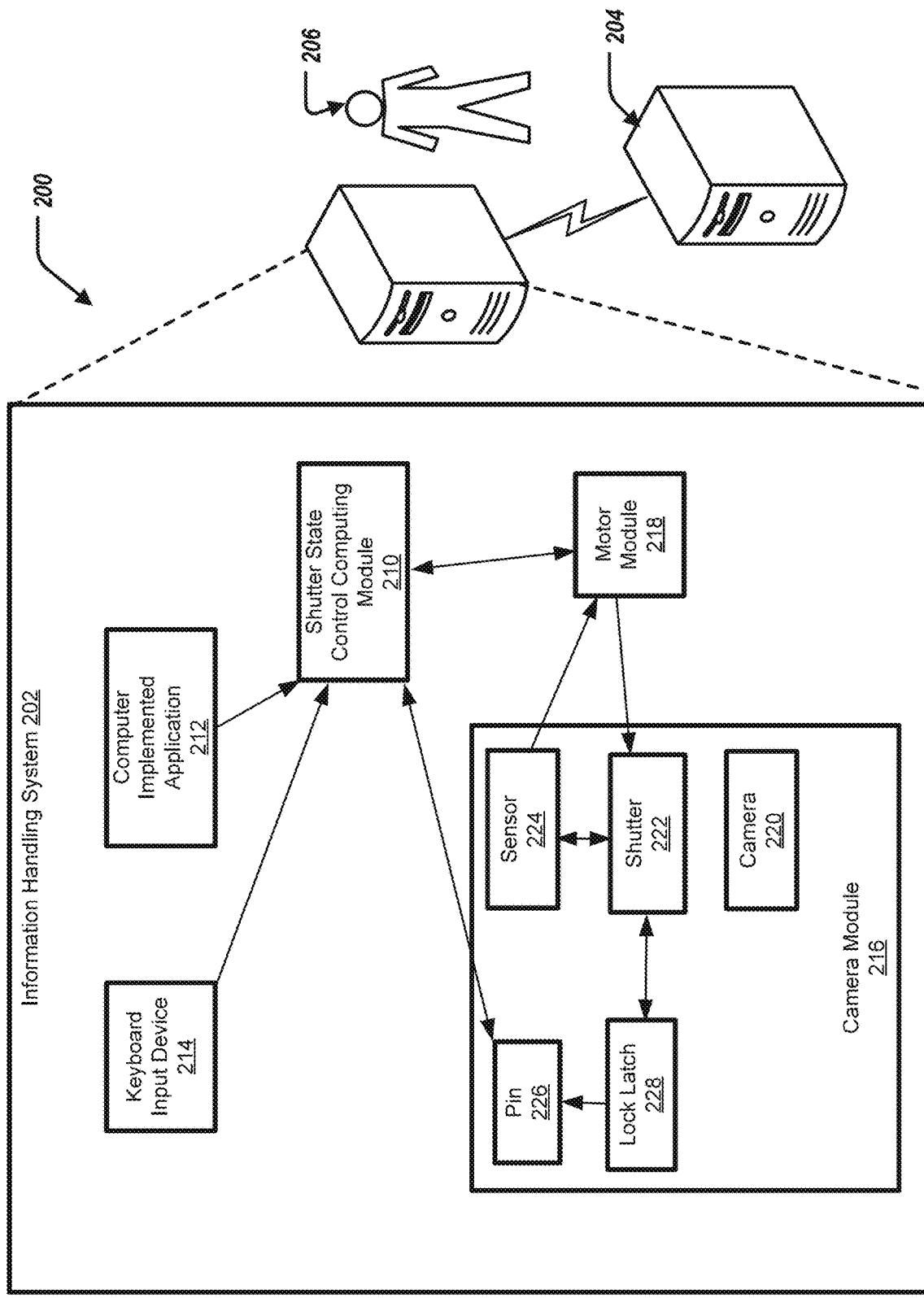
FIG. 2 illustrates a block diagram of an information handling system for controlling a state of a shutter of a camera module of the information handling system.

Turning to FIG. 2, FIG. 2 illustrates an environment 200 including an information handling system 202, an unauthorized source 204, and a user 206. The information handling system 202 can include a shutter state control computing module 210, a computer-implemented application 212, a keyboard input device 214, a camera module 216, and a motor module 218. The camera module 216 can include a camera 220, a shutter 222, a sensor 224, a pin 226, and a lock latch 228. In some examples, the information handling system 202 is similar to, or includes, the information handling system 100 of FIG. 1. In some examples, the shutter state control computing module 210 is the same, or substantially the same, as the shutter state control computing module 190 of FIG. 1. In some examples, the computer-implemented application 212 is the same, or substantially the same, as the computer-implemented application 198 of FIG. 1. In some examples, the keyboard input device 214 is the same, or substantially the same, as the keyboard input device 192 of FIG. 1. In some examples, the camera module 216 is the same, or substantially the same, as the camera module 194 of FIG. 1.

The shutter state control computing module 210 can be in communication with the computer-implemented application 212, the keyboard input device 214, the camera 220, and the pin 226. The motor module 218 can be in communication with the shutter 222 and the sensor 224.

Figure 3:
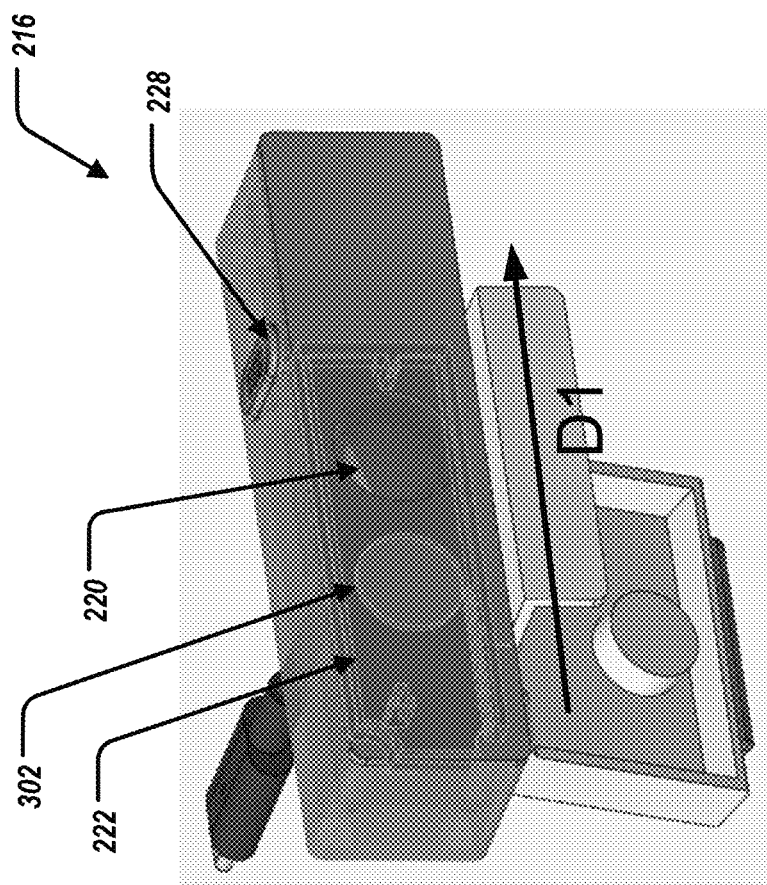
FIG. 3 illustrates the camera module in a closed state.

FIG. 3 illustrates a physical implementation of the camera module 216. In particular, the camera module 216 is shown in a closed state, described further herein. The shutter 222 can include an aperture 302. The shutter 222 can be formed from an opaque material.

Figure 4A:
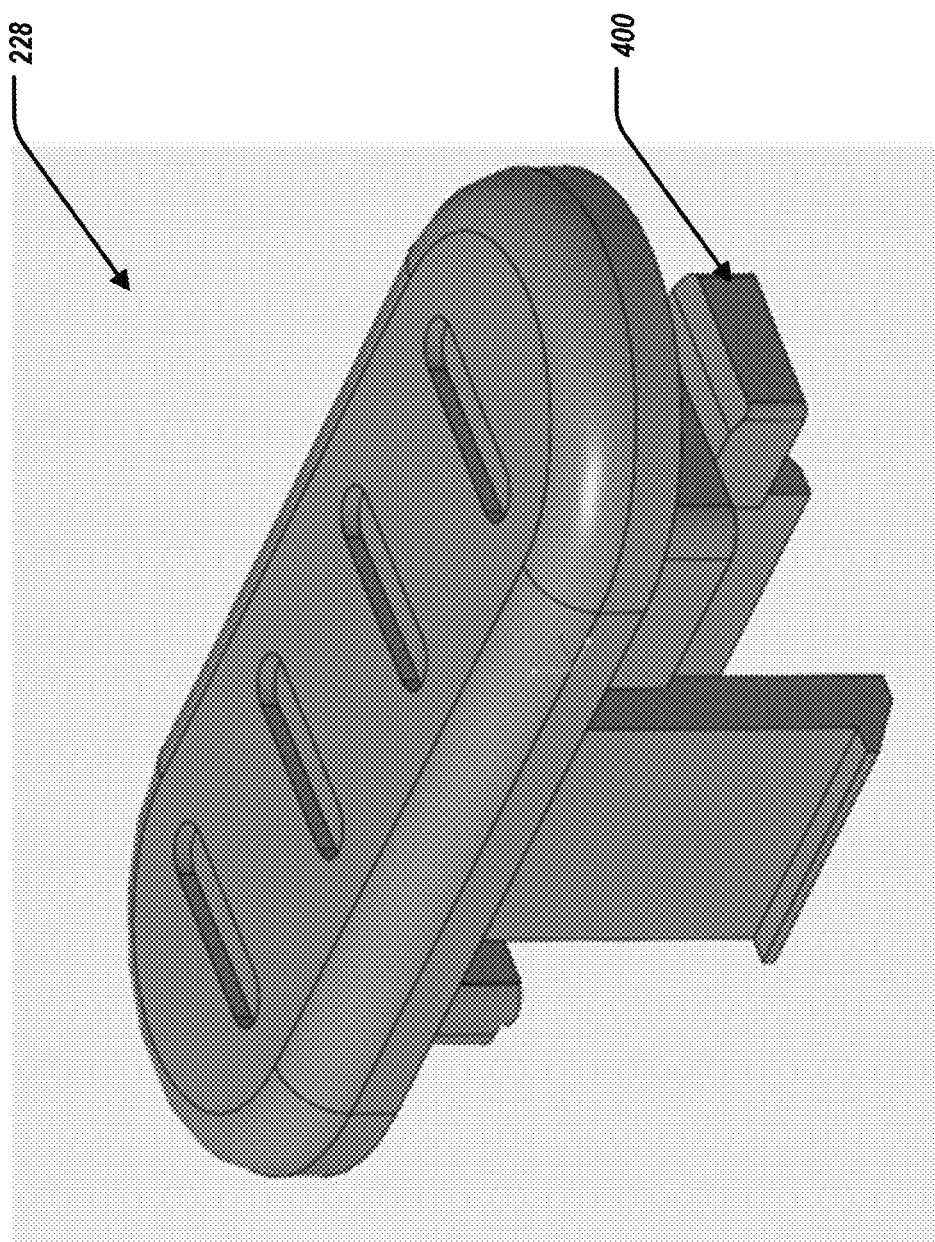
FIGS. 4A, 4B, 17 illustrate a lock latch of the camera module.
Figure 4B:
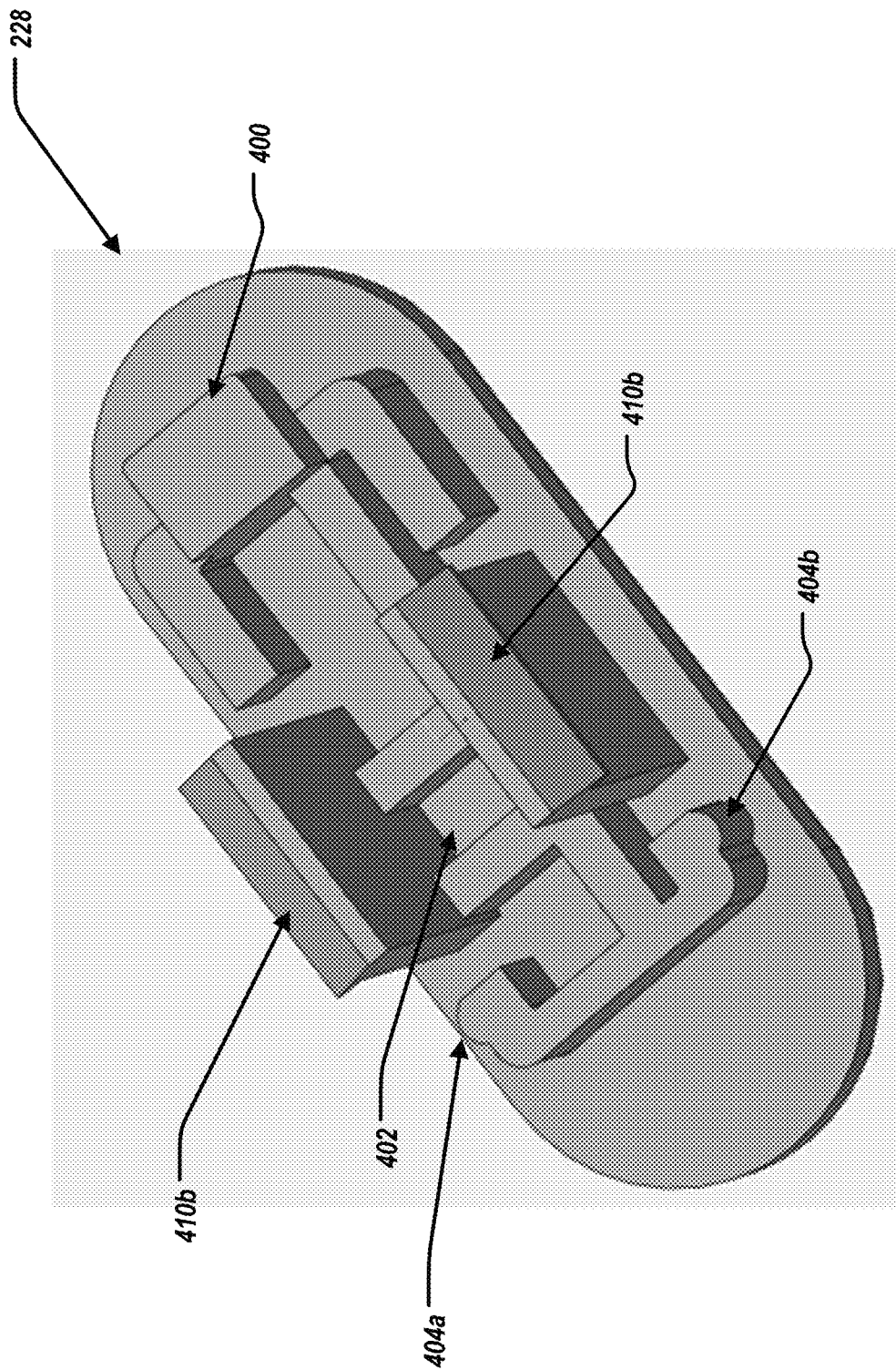

FIGS. 4A and 4B illustrate a physical implementation of the lock latch 228. The lock latch 228 can include a shutter lock rib 400, a holding feature 402, and interference bumps 404a, 404b (collectively referred to as interference bumps 404). The lock latch 228 can be comprised of nylon, and is translatable within the camera module 216. The interference bumps 404 can maintain a desired positioning of the lock latch 228 with respect to the camera module 216 by matching with corresponding holes of the camera module 216. The lock latch 228 can further include snaps 410a, 410b for maintaining the lock latch 228 coupling with the camera module 216. The holding feature 402 can engage with (in contact with) the pin 226 (or switch 226), described further herein.

Figure 5:
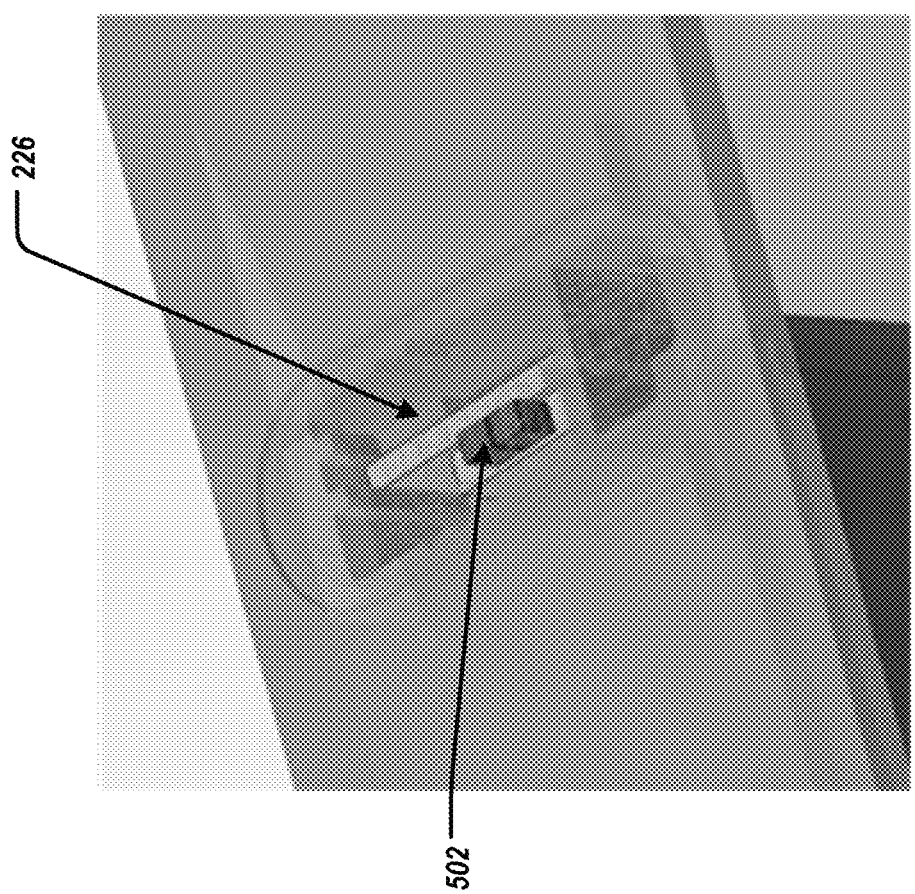
FIG. 5 illustrates a pin of the camera module, in a first state.

FIG. 5 illustrates a physical implementation of the pin 226. The pin 226 (or switch 226) can include a general purpose input/output (GPIO) pin. The pin 226 can in contact with the lock latch 228, and/or coupled to an underside of the lock latch 228 (i.e., the side opposite to an exposed side of the lock latch 228).

Figure 6:
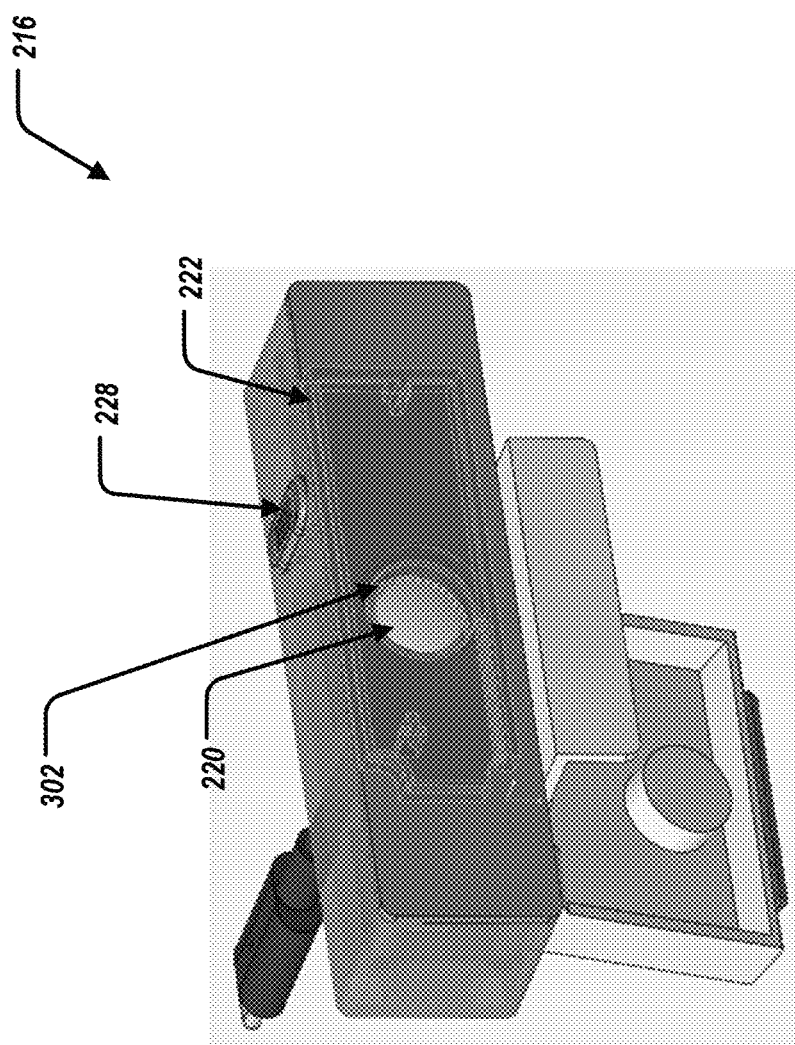
FIG. 6 illustrates the camera module in an open state.

Referring back to FIG. 2, the shutter state control computing module 210 can receive a signal indicating to adjust the shutter 222 from an open state to a closed state to prevent access to the camera 220. FIG. 6 illustrates the camera module 216 shown in an open state. The camera module 216 is in the open state when the aperture 302 of the shutter 222 is aligned with (or in superimposition with) the camera 220. When the camera module 216 is in the open state, the camera 220 is accessible (or exposed).

In some examples, the shutter state control computing module 210 can receive the signal from the computer-implemented application 212 that is executing on the information handling system 202. For example, the computer-implemented application 212 can include a video-conferencing application that accesses/utilizes the camera 220. When the user 206 is done interacting with the video-conferencing application, the user 206 can instruct the video-conferencing application to place the shutter 222 in a closed state (e.g., for privacy concerns). For example, the user 206 can select a user-interface element (e.g., provided on a display of the information handling system 202 that displays a graphical user interface (GUI) of the video-conferencing application) to enable placing the shutter 222 in the closed state.

In some examples, the shutter state control computing module 210 can receive the signal from the keyboard input device 214. For example, data indicating a keypress (or combination of keypresses) can be received by the shutter state control computing module 210. The keypress (or combination keypresses) can be associated with (or can indicate) positioning of the shutter 222 in the closed state. For example, the user 206 can provide user input of the keypress (or combination of keypresses) to enable placing of the shutter 222 in the closed state.

Figure 7:
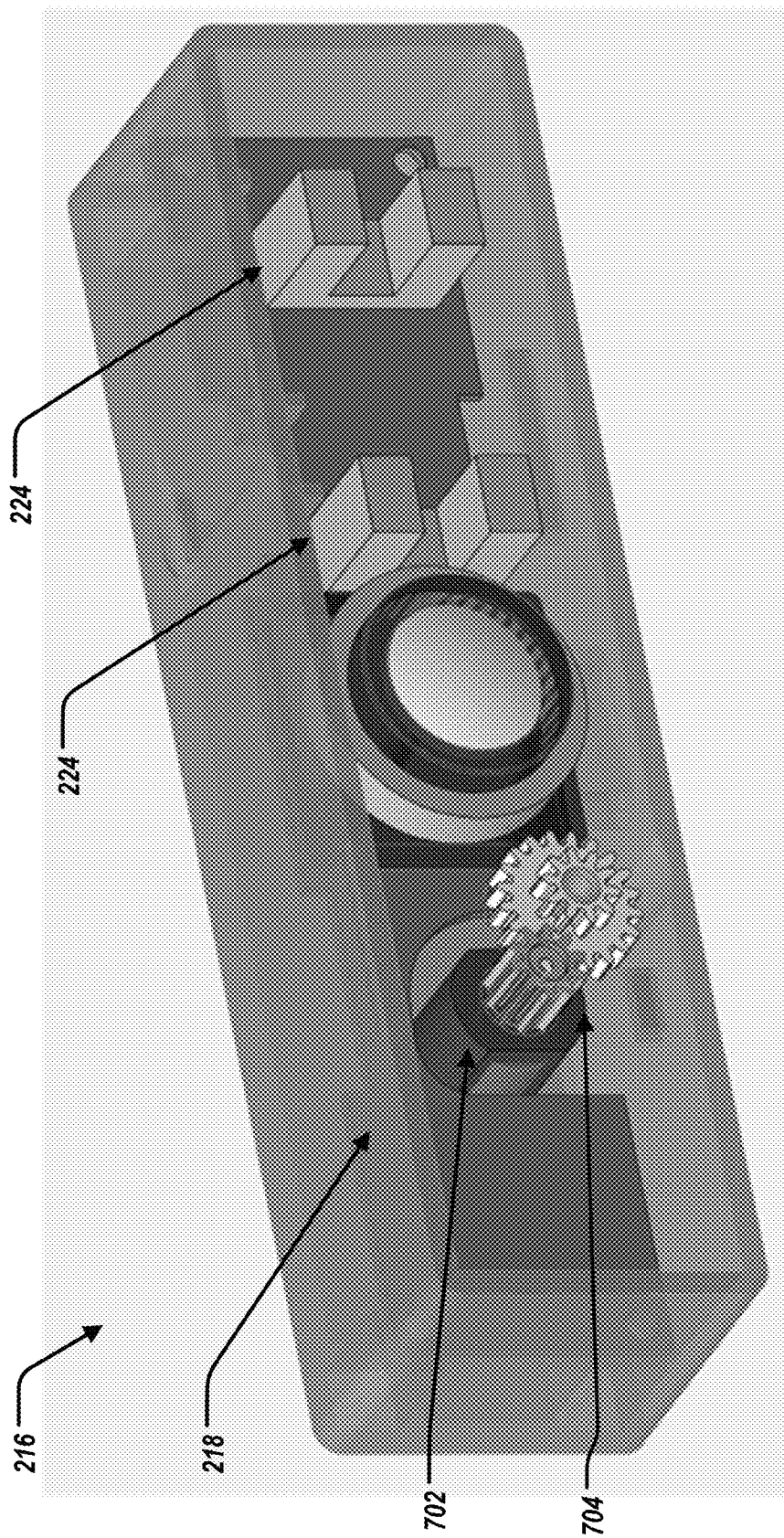
FIG. 7 illustrates a cut-away view of the camera module including a motor module.
Figure 8:
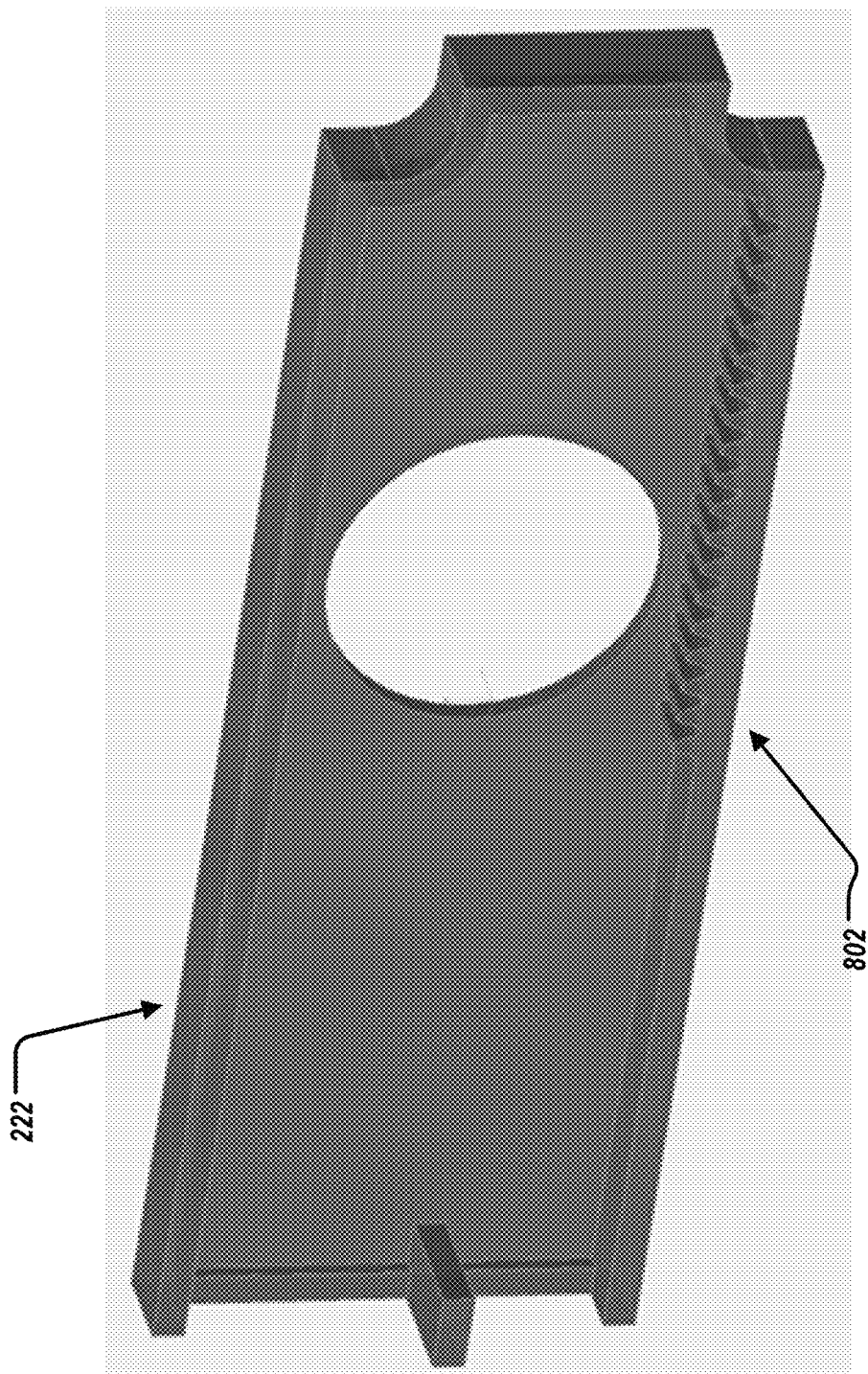
FIG. 8 illustrates a shutter of the camera module.

The shutter state control computing module 210, in response to the signal indicating to adjust the shutter 222 from the open state to the closed state, mechanically adjusts the shutter 222 from the open state to the closed state. Specifically, the shutter state control computing module 210 can provide a signal to the motor module 218 indicating the motor module 218 to mechanically adjust the positioning of the shutter 222 from the open state to the closed state. The motor module 218 can mechanically adjust the positioning of the shutter 222 from the open state, as shown in FIG. 6, to the closed state, as shown FIG. 3. In some examples, as shown in FIG. 7, the motor module 218 can include a direct current (DC) stepper motor 702 and gears 704. As shown in FIG. 8, the shutter 222 can further include a corresponding gear rack 802 to the gears 704. The motor 702 can rotate the gears 704 in a desired direction such that the gears 704 translate the gear rack 802, and correspondingly, the shutter 222, from the open state to the closed state.

Referring back to FIG. 2, the motor module 218, in response to the signal indicating to adjust the shutter 222 from the open state to the closed state, can further receive a signal from the sensor 224 to indicate that the shutter 222 is in the closed state. In some cases, the shutter state control computing module 210 can receive the signal from the sensor 224 to indicate that the shutter 222 is in the closed state and relay such signal to the motor module 218. The motor module 218, in response to the signal from the sensor 224 detecting the positioning of the shutter 222 within the camera module 216 to indicate that the shutter 222 is in the closed state, can cease adjusting the positioning of the shutter 222. That is, the motor 702 can cease rotating the gears 704 in the desired direction such that translation of the gear rack 802, and correspondingly, the shutter 222, is ceased. In some cases, the shutter state control computing module 210 can provide a signal to the motor 702 to cease adjusting the positioning of the shutter 222 (i.e., when the shutter state control computing module 210 receives the signal from the sensor 224 to indicate that the shutter is in the closed state).

Figure 9A:
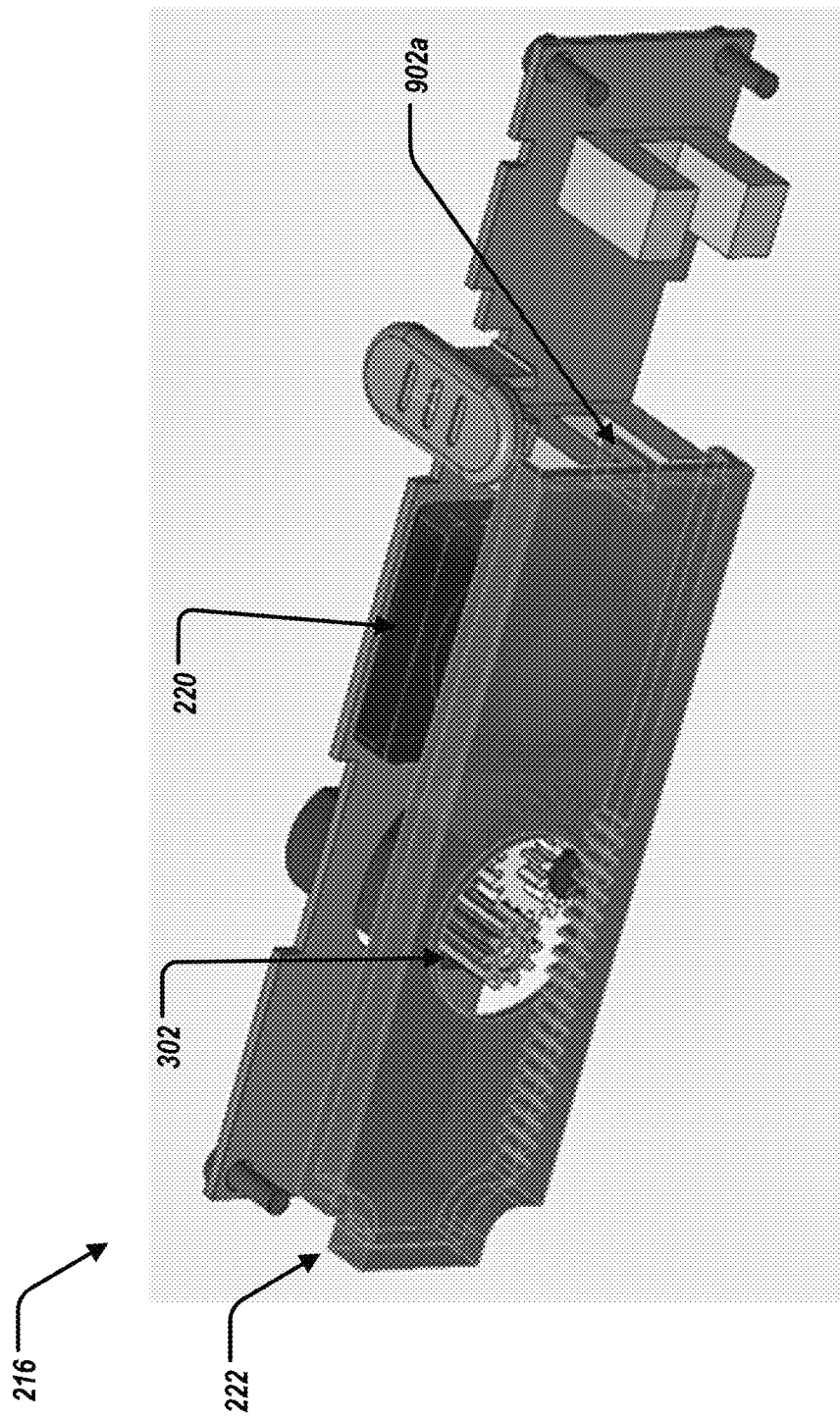
FIGS. 9A, 9B illustrate a cut-away view of the camera module including a transmissive photo interrupter.
Figure 9B:
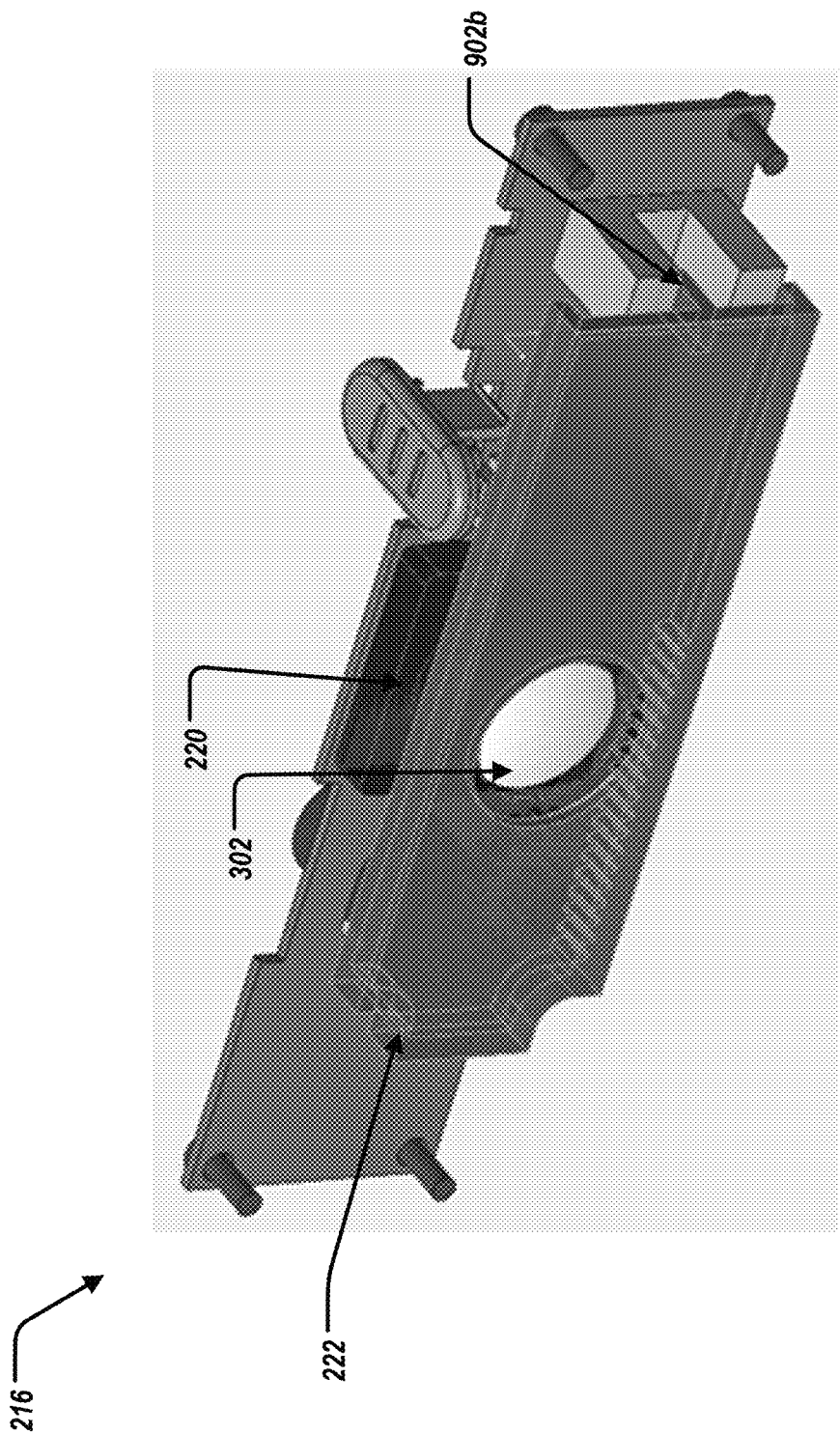

FIGS. 9A, 9B illustrate cut-away views of the camera module 216. In some examples, the sensor 224 can include a transmissive photo interrupter, shown as sensors 902a, 902b (collectively referred to as sensors 902). When the shutter 222 is in the closed state, as shown in FIG. 9A, the sensor 902a is interrupted (visually blocked), thus indicating that the shutter 222 is in the closed state (the aperture 302 not aligned with the camera 220). When the shutter 222 is in the open state (the aperture 302 aligned with the camera 220), as shown in FIG. 9B, the sensor 902b is interrupted (visually blocked), thus indicating that the shutter 222 is in the open state.

Figure 10A:
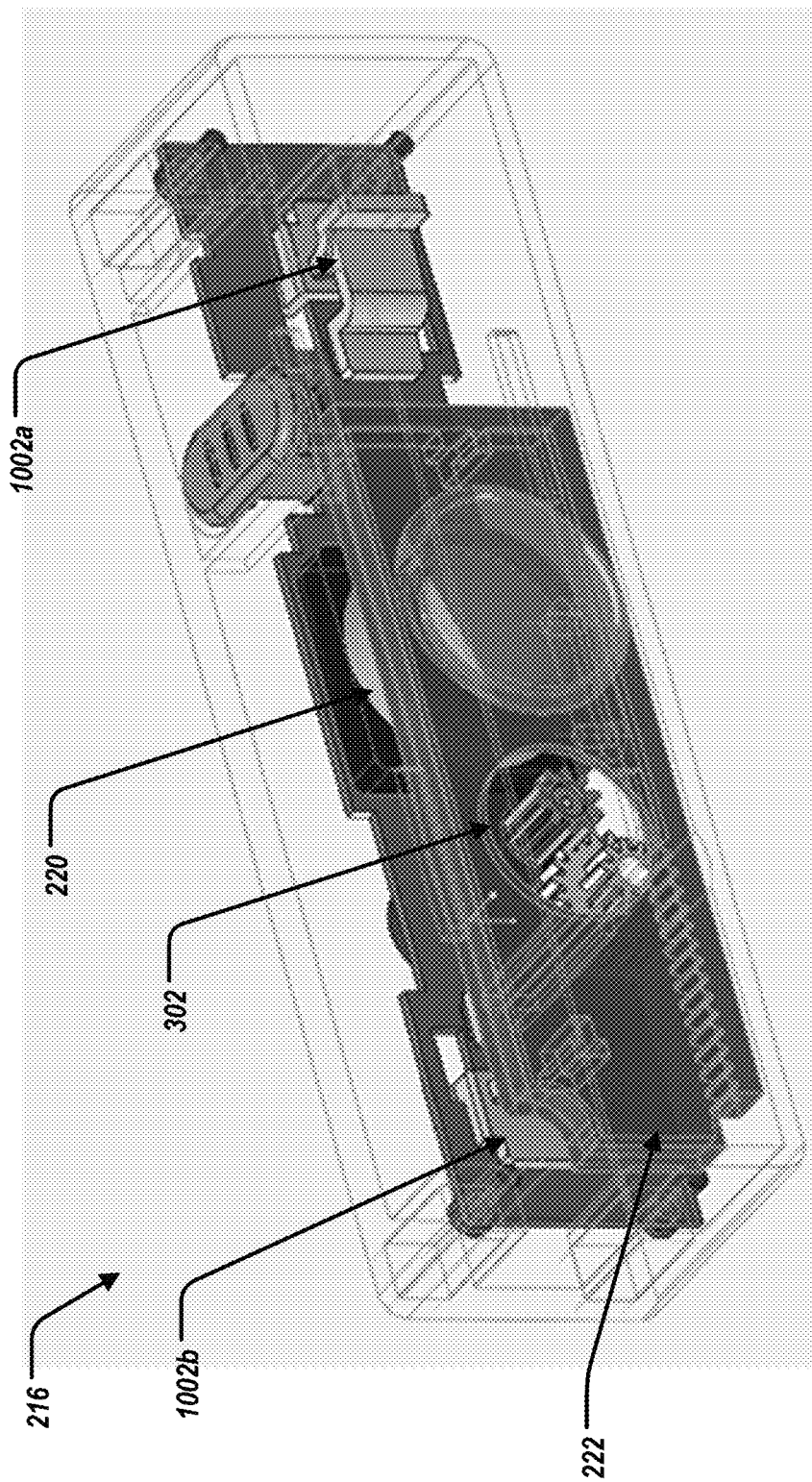
FIGS. 10A, 10D illustrate a cut-away view of the camera module including a sensor spring rocker.
Figure 10B:
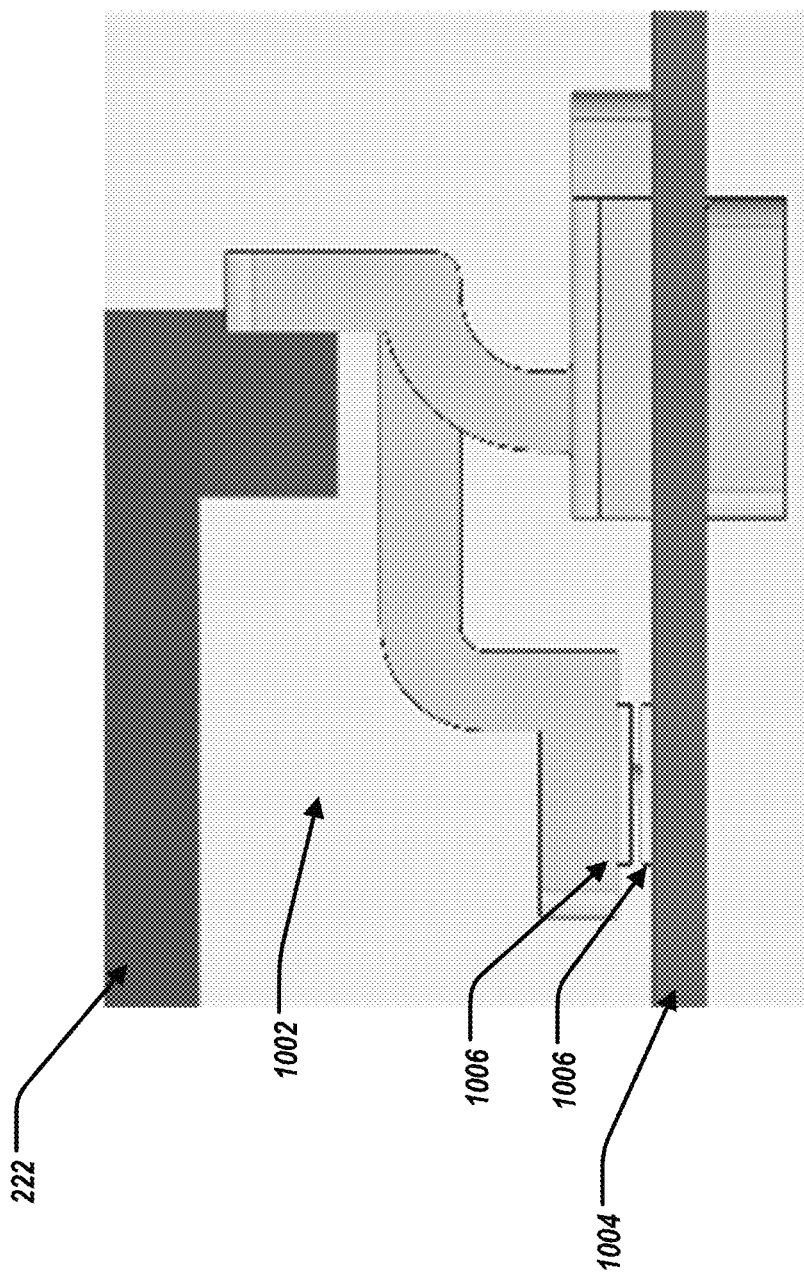
FIGS. 10B, 10C illustrate the sensor spring rocker of FIGS. 10A, 10D.
Figure 10C:
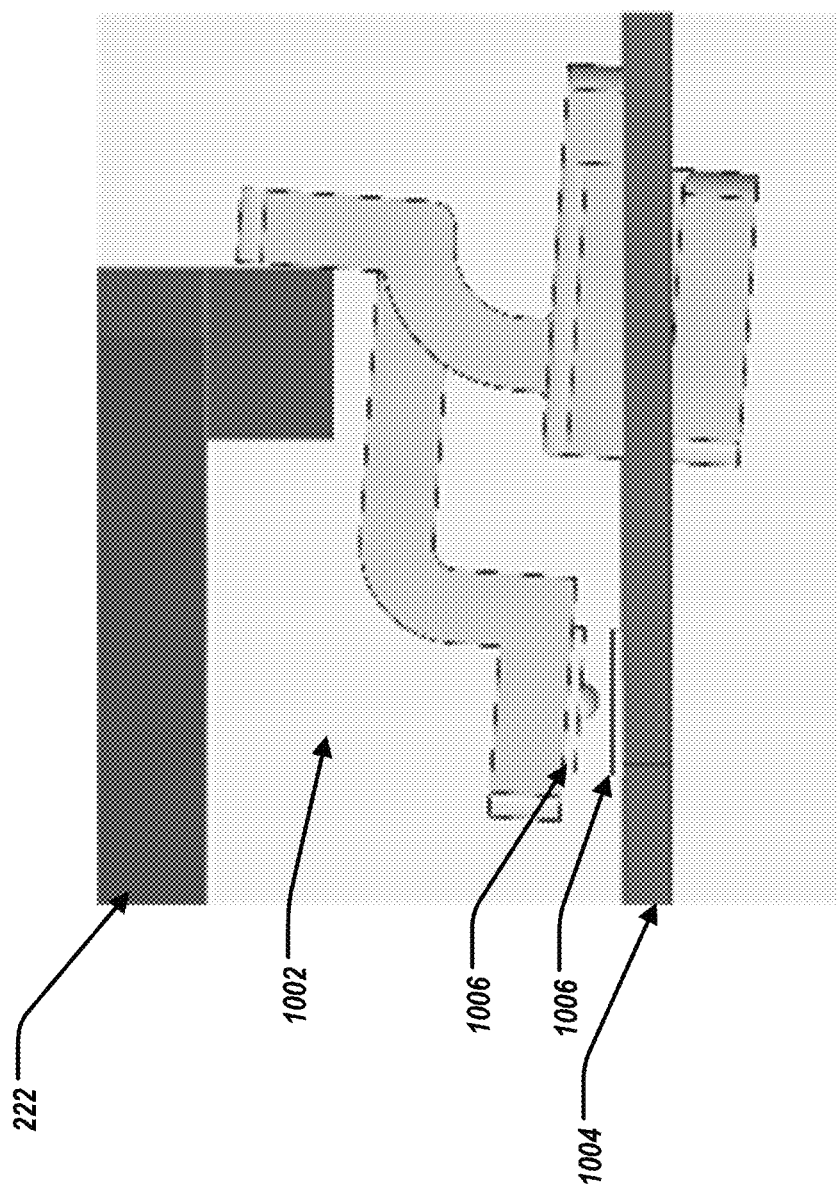
Figure 10D:
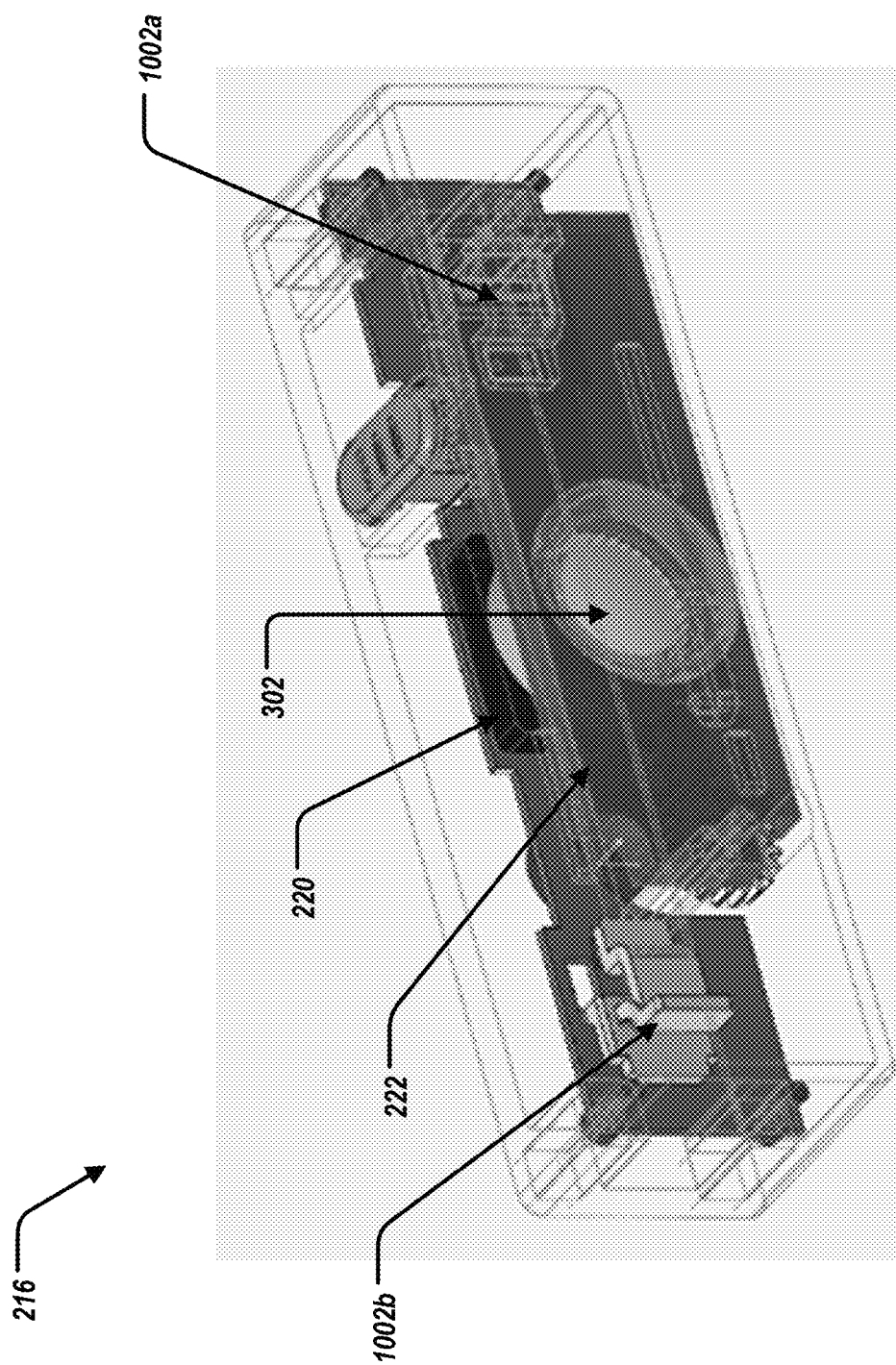

FIGS. 10A, 10D illustrate cut-away views of the camera module 216. In some examples, the sensor 224 can include a sensor spring rocker, shown as sensors 1002a, 1002b (collectively referred to as sensors 1002). When the shutter 222 is in the closed state (the aperture 302 not aligned with the camera 220), as shown in FIG. 10A, the sensor 1002a is disengaged and the sensor 1002b is engaged, thus indicating that the shutter 222 is in the closed state. Specifically, as shown in FIG. 10B, the sensor 1002 includes a plate 1004 and pads 1006. The pads 1006 can be engaged with each other (in electrical contact with each other), as shown in FIG. 10B; or can be disengaged with each other (not in electrical contact with each other), as shown in FIG. 10C. When the shutter 222 is in the open state (the aperture 302 aligned with the camera 220), as shown in FIG. 10D, the sensor 1002a is engaged and the sensor 1002b is disengaged, thus indicating that the shutter 222 is in the open state.

Figure 11A:
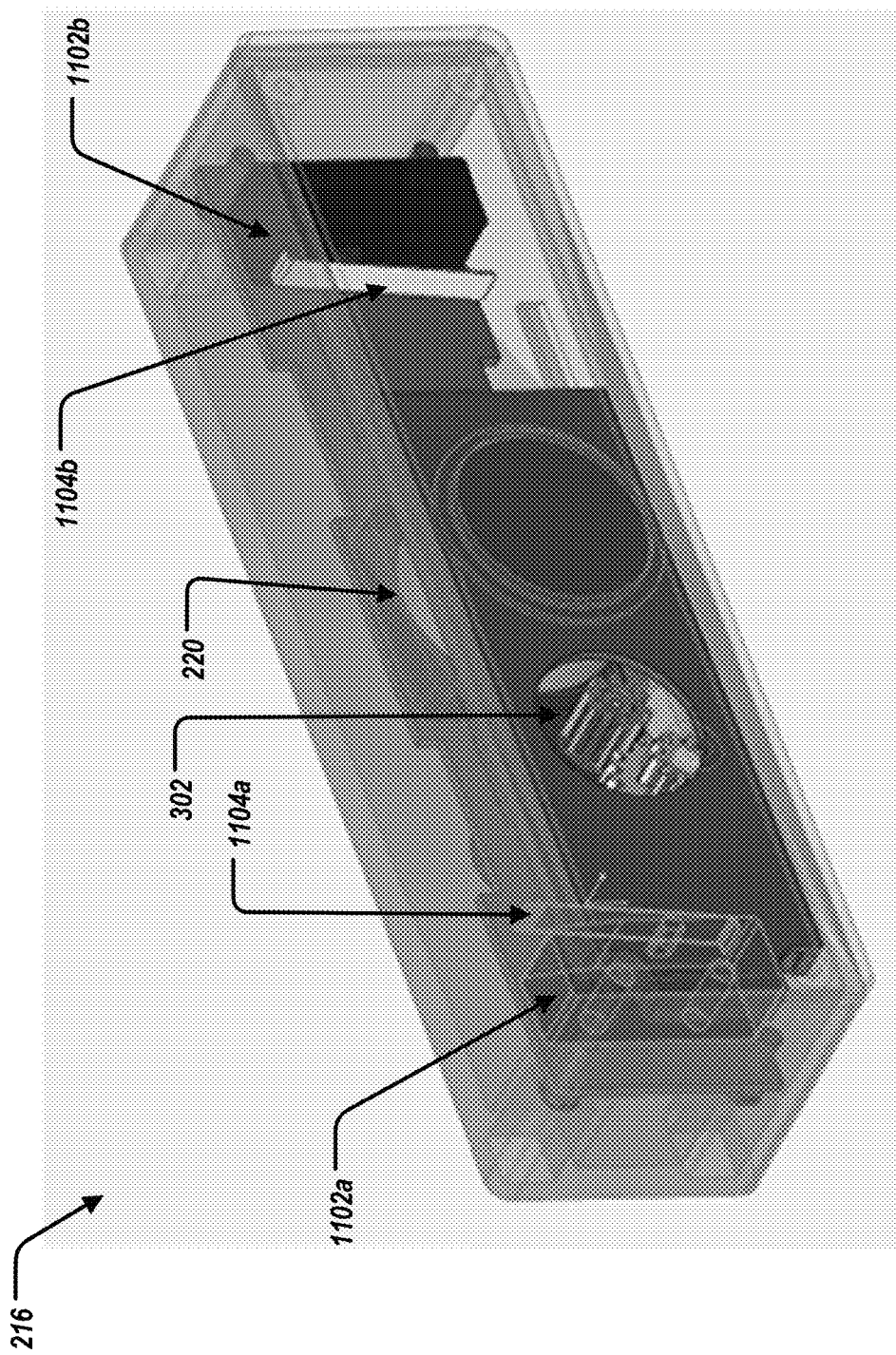
FIGS. 11A, 11B illustrate a cut-away view of the camera module including a side mount limit switch.
Figure 11B:
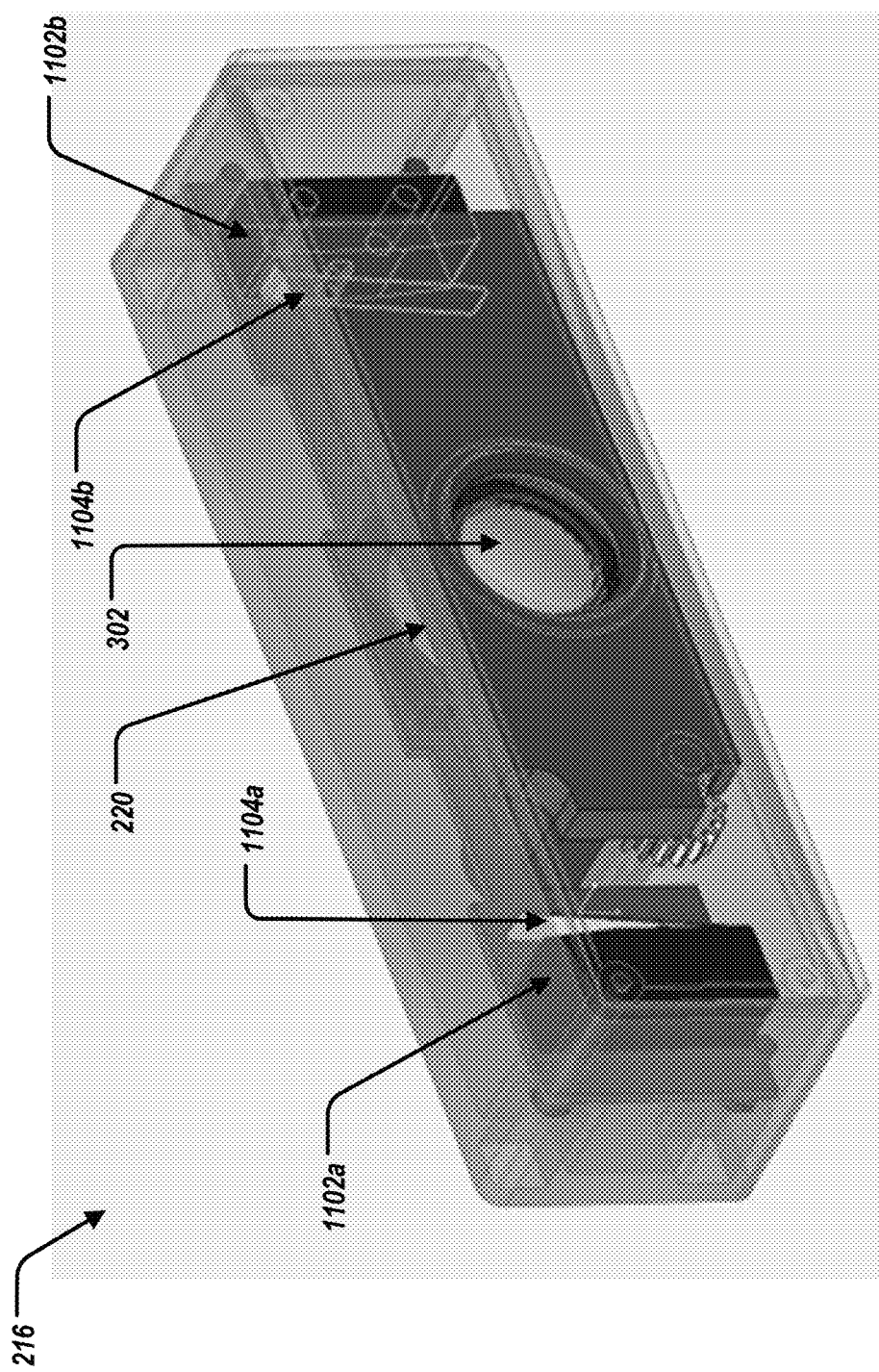

FIGS. 11A, 11B illustrate cut-away views of the camera module 216. In some examples, the sensor 224 can include a side mount limit switch, shown as sensors 1102a, 1102b (collectively referred to as sensors 1102). When the shutter 222 is in the closed state(the aperture 302 not aligned with the camera 220), as shown in FIG. 11A, a lever 1104a of the sensor 1102a is engaged and a lever 1104b of the sensor 1102b is disengaged, thus indicating that the shutter 222 is in the closed state. When the shutter 222 is in the open state (the aperture 302 aligned with the camera 220), as shown in FIG. 11B, the lever 1104a of the sensor 1102a is disengaged and the lever 1104b of the sensor 1102b is engaged, thus indicating that the sensor 224 is in the open state.

Figure 12A:
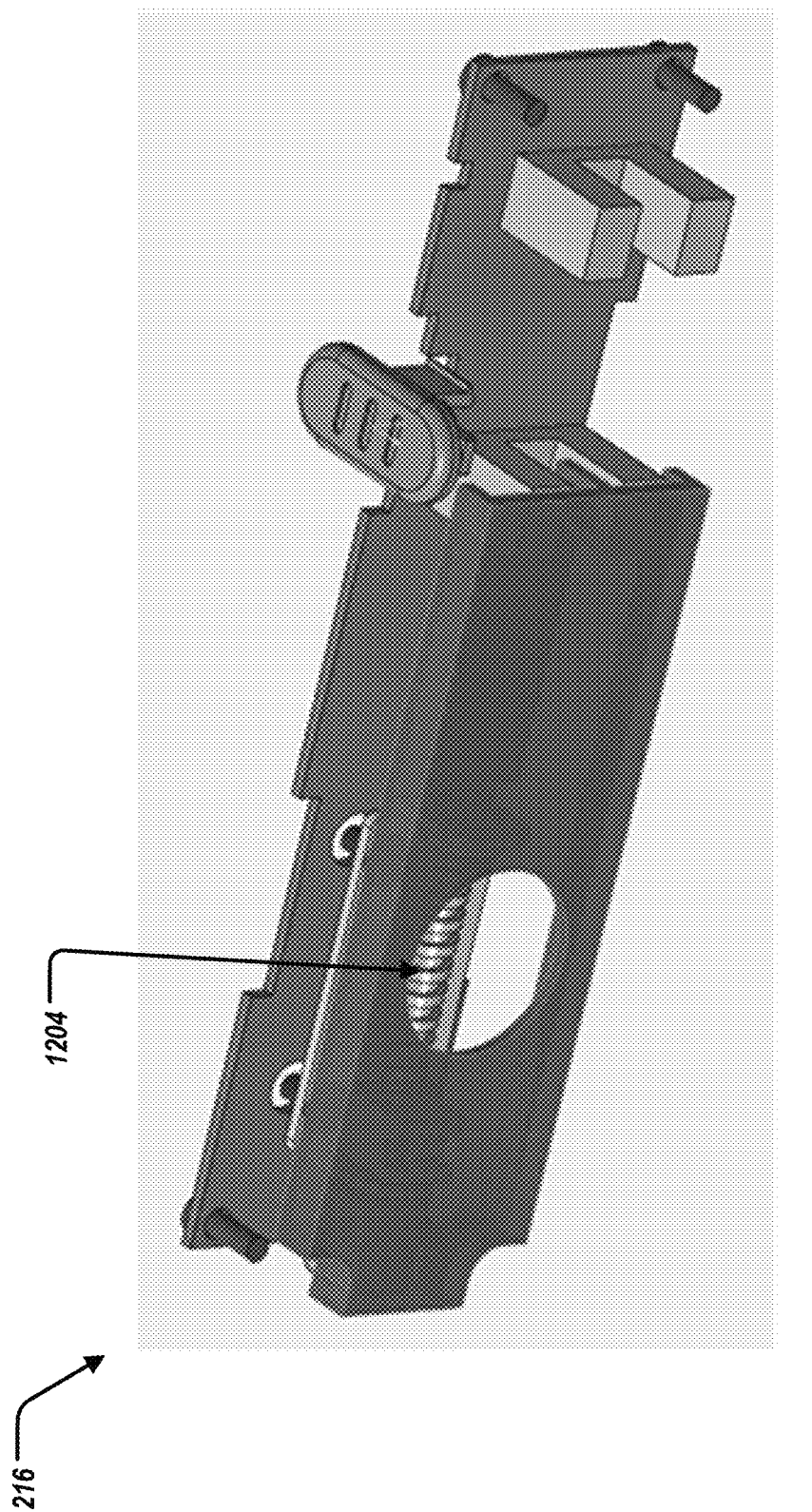
FIGS. 12A, 12B illustrate a cut-away view of the camera module including a spiral actuator and a rod screw.
Figure 12B:
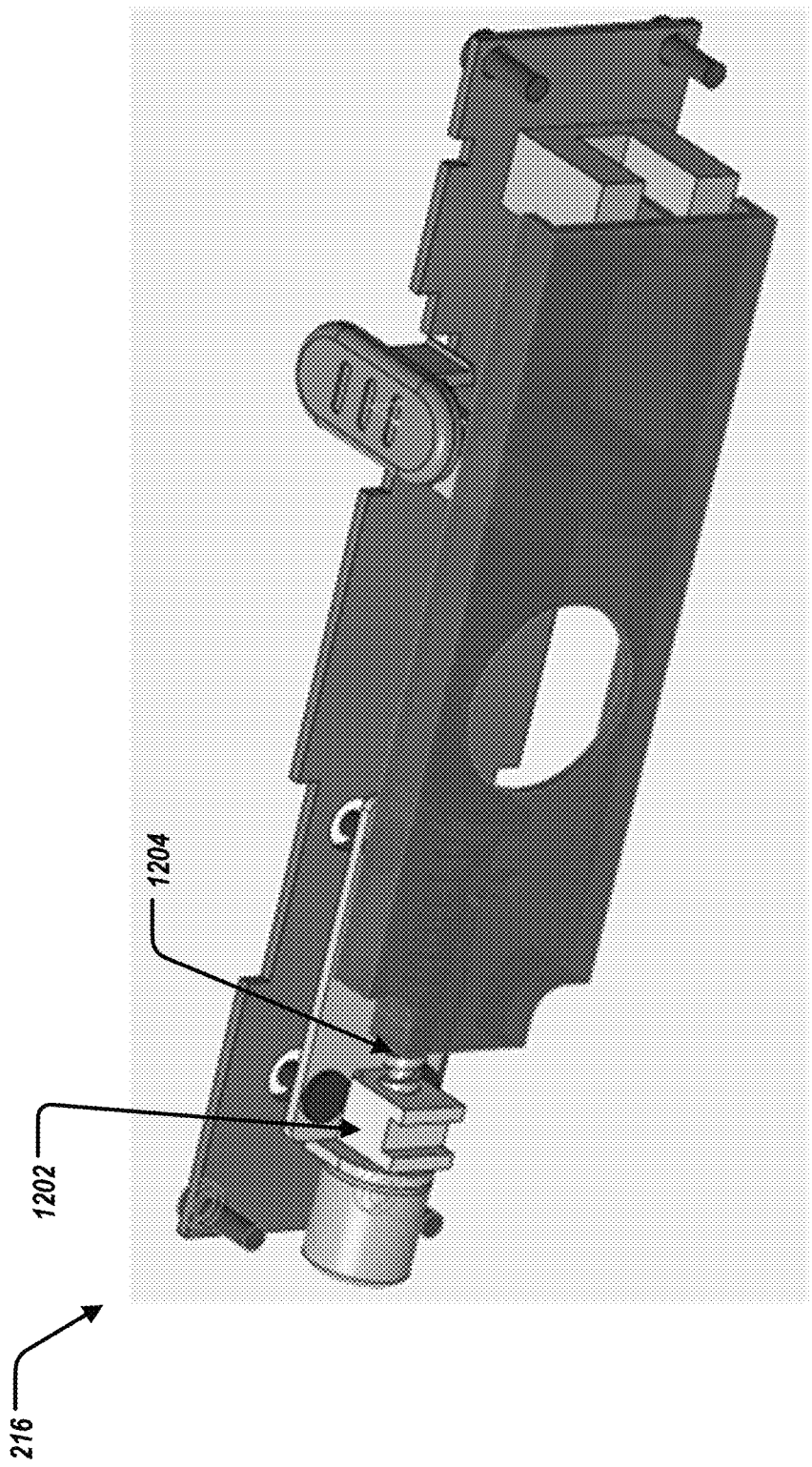

FIGS. 12A and 12B illustrate cut-away views of the camera module 216. In some examples, the motor module 218 can include a spiral actuator 1202 and a rod screw 1204. The spiral actuator 1202 can rotate the rod screw 1204 that is engaged with the shutter 222. As the rod screw 1204 is rotated, the shutter 222 is translated between the closed state, as shown in FIG. 12A, to the open state, as shown in FIG. 12B.

Figure 13:
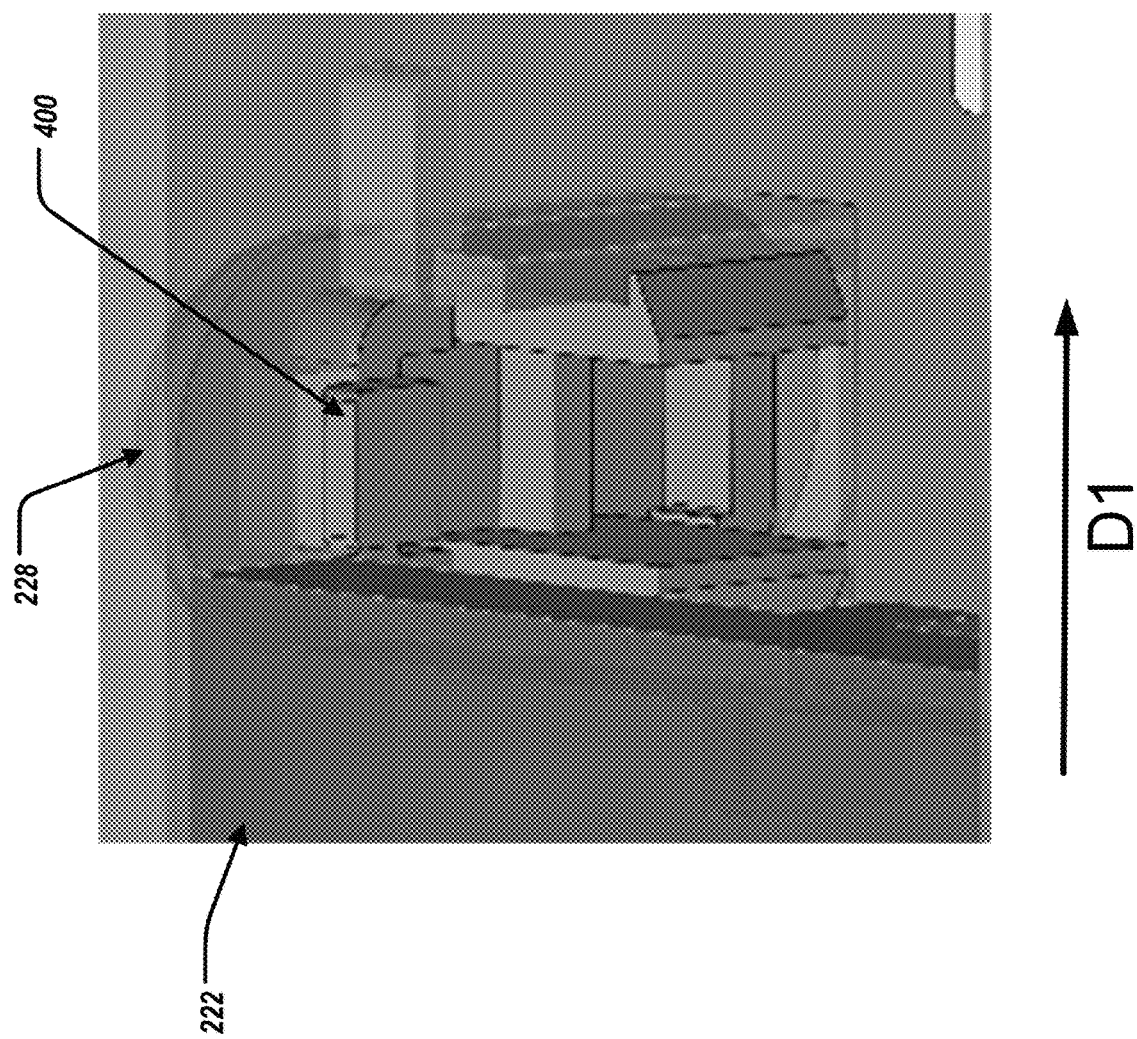
FIG. 13 illustrates the lock latch engaged with the shutter.

Referring back to FIG. 2, after adjusting the state of the shutter 222 from the open state to the closed state, the shutter state control computing module 210 can receive a signal from the pin 226 indicating that a state of the pin 226 indicates that the lock latch 228 is engaged with the shutter 222 to mechanically interfere with movement of the shutter 222 from the closed state to the open state. Specifically, after the shutter 222 is placed in the closed state, the user 206 can physically engage with the lock latch 228 to translate ("slide") the lock latch 228 to a "locked" positioning such that the lock latch 228 is engaged with the shutter 222 to mechanically interfere with movement of the shutter 222 from the closed state to the open state. FIG. 13 illustrates the lock latch 228 engaged with the shutter 222. Specifically, the lock rib 400 can engage with the shutter 222 to prevent translation of the shutter 222 along the direction D1 (also shown in FIG. 3). That is, the lock rib 400 provides a physical barrier to translation of the shutter 222 from the closed state to the open state.

Moreover, when the lock latch 228 is translated such that the lock latch 228 is engaged with the shutter 222, the lock latch 228 sets the state of the pin 226. That is, the lock latch 228 can provide a physical and/or a mechanical and/or an electrical connection with a first tab 502 of the pin 226, as shown in FIG. 5. When such a connection is made with the tab 502 of the pin 226, the pin 226 can provide a signal (e.g., a state of "0") to the shutter state control computing module 210 that the state of the pin 226 indicates that the lock latch 228 is engaged with the shutter 222 to mechanically interfere with movement of the shutter 222 from the closed state to the open state.

Referring back to FIG. 2, the shutter state control computing module 210 can detect an attempt to adjust the state of the shutter 222 to the open state from the closed state while the lock latch 228 is engaged with the shutter 222. Specifically, the shutter state control computing module 210 can detect an unauthorized attempt to adjust the state of the shutter 222 to the open state from the closed state while the lock latch 228 is engaged with the shutter 222 from the unauthorized source 204. For example, the unauthorized source 204 can attempt to take control of the camera module 216, and utilize the camera 220 by placing the shutter 222 in the open state.

The shutter state control computing module 210, in response to detecting the attempt to adjust the state of the shutter 222 to the open state from the closed state while the lock latch 228 is engaged with the shutter 222, identifies that the state of the pin 226 indicates that the lock latch 228 is engaged with the shutter 222, as previously established. In some examples, the shutter state control computing module 210 can access the pin 226 to identify the state of the pin 226. That is, the pin 226 can send a signal to the shutter state control computing module 210 indicating that the pin 226 is in state "0"—that the lock latch 228 is engaged with the shutter 222.

The shutter state control computing module 210, based on the state of the pin 226 indicating that the lock latch 228 is engaged with the shutter 222, prevents mechanical adjustment of the state of the shutter 222 to the open state from the closed state. That is, the shutter state control computing module 210 prevents providing a signal to the motor module 218 to indicate to mechanically adjust the shutter 222 from the closed state to the open state. As a result, the motor module 218 will not mechanically translate the shutter 222 when the pin 226 is in state "0"—when the lock latch 228 is engaged with the shutter 222. In some cases, the shutter state control computing module 210 provides a signal to the motor module 218 to indicate to not mechanically adjust the shutter 222 from the closed state to the open state.

In some cases, the shutter state control computing module 210, in response to detecting the attempt to adjust the state of the shutter 222 to the open state from the closed state while the pin 226 indicates that lock latch 228 is engaged with the shutter 222, provides a notification to a display device of the information handling system 202 indicating the attempt to adjust the state of the shutter 222 to the open state from the closed state. That is, the notification can indicate the unauthorized attempt by the unauthorized source 204 to adjust the state of the shutter 222 to the open state from the closed state.

In some cases, after the state of the pin 226 is set to indicate the state "0" (e.g., the shutter 222 is in the closed state), the lock latch 228 may no longer mechanically interfere with movement of the shutter 222 from the closed state to the open state. For example, the lock latch 228 may become broken or mispositioned such that the lock latch 228 no longer mechanically interferes with movement of the shutter 222 from the closed state to the open state. Furthermore, the shutter state control computing module 210, in response to detecting the attempt to adjust the state of the shutter 222 to the open state from the closed state, identifies that the state of the pin 226 indicates a "0" state (e.g., the shutter 222 is in the closed state).

The shutter state control computing module 210, based on the state of the pin 226 indicating that the shutter 222 is in the closed state, prevents mechanical adjustment of the state of the shutter 222 to the open state from the closed state. That is, the shutter state control computing module 210 prevents providing a signal to the motor module 218 to indicate to mechanically adjust the shutter 222 from the closed state to the open state. As a result, the motor module 218 will not mechanically translate the shutter 222 when the pin 226 is in state "0."

In some examples, the shutter state control computing module 210 can receive a signal indicating to adjust the shutter 222 from the closed state to the open state to provide access to the camera 220. FIG. 6 illustrates the camera module 216 shown in the open state. In some examples, the shutter state control computing module 210 can receive the signal from the computer-implemented application 212, or the keyboard input device 214. The shutter state control computing module 210, in response to the signal indicating to adjust the shutter 222 from the closed state to the open state to provide access to the camera 220, determines that the state of the pin 226 indicates that the lock latch 228 is disengaged from the shutter 222. That is, the shutter state control computing module 210 can receive a signal from the pin 226 indicating that a state of the pin 226 indicates that the lock latch 228 is disengaged with the shutter 222 to allow movement of the shutter 222 from the closed state to the open state. Specifically, the user 206 can physically engage with the lock latch 228 to translate ("slide") the lock latch 228 to an "unlocked" positioning such that the lock latch 228 is disengaged with the shutter 222 to allow movement of the shutter 222 from the closed state to the open state. Specifically, the lock rib 400 can disengage with the shutter 222 to allow translation of the shutter 222 along the direction D1 (shown in FIG. 3). The shutter state control computing module 210 can mechanically adjust the shutter 222 from the closed state to the open state. Specifically, the shutter state control computing module 210 can provide a signal to the motor module 218 indicating the motor module 218 to mechanically adjust the positioning of the shutter 222 from the closed state to the open state. The motor module 218 can mechanically adjust the positioning of the shutter 222 from the closed state to the open state, as shown FIG. 6.

Figure 14:
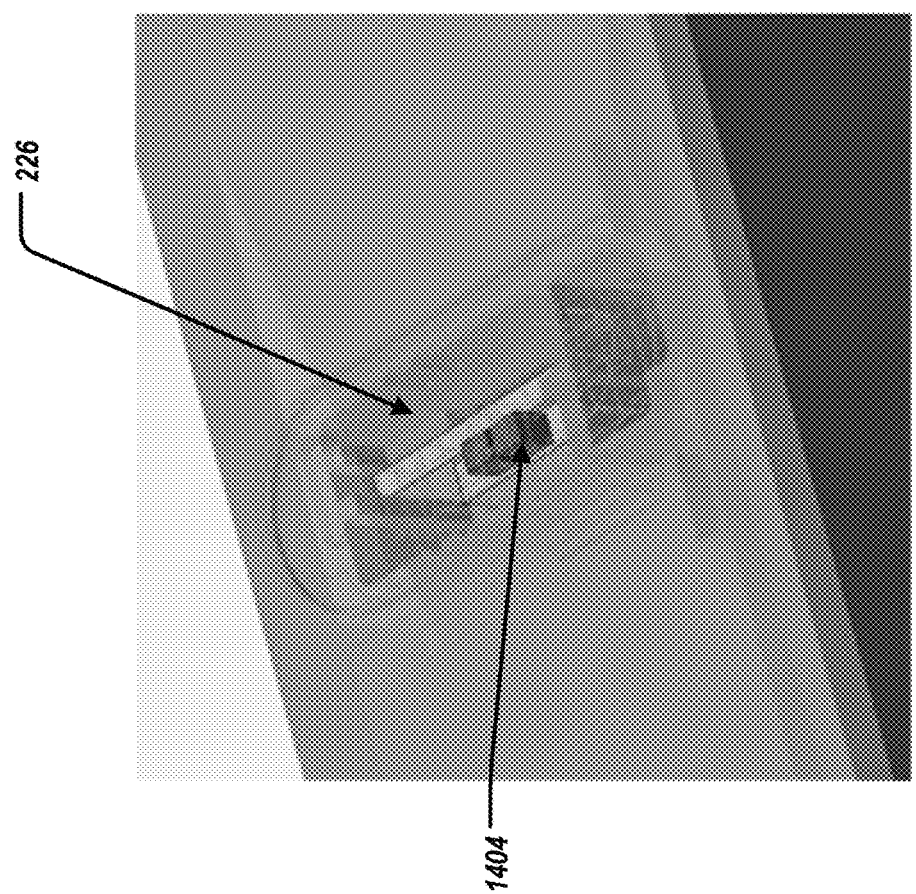
FIG. 14 illustrates the pin of the camera module, in a second state.

Moreover, when the lock latch 228 is translated such that the lock latch 228 is disengaged from the shutter 222, the lock latch 228 sets the state of the pin 226. That is, the lock latch 228 can provide a physical and/or mechanical and/or electrical connection with a second tab 1404 of the pin 226, as shown in FIG. 14. When such a connection is made with the tab 1404 of the pin 226, the pin 226 can provide a signal (e.g., a state of "1") to the shutter state control computing module 210 that the state of the pin 226 indicates that the lock latch 228 is disengaged with the shutter 222 to allow movement of the shutter 222 from the closed state to the open state.

Figure 17:
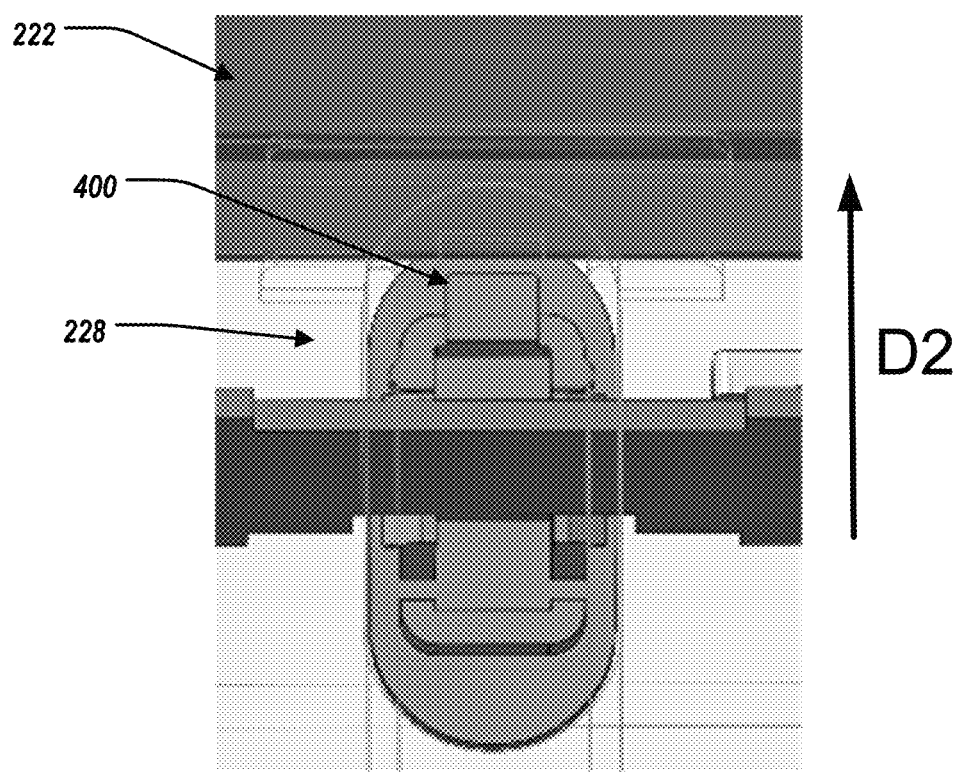

In some examples, when the lock latch 228 is in the "unlocked" position and the shutter 222 is in the open state, an interference between the lock latch 228 and the shutter 222 can additionally prevent translation of the lock latch 228 (e.g., to the "locked" position). For example, as shown in FIG. 17, the lock latch 228 is shown in the "unlocked" position, with the shutter 222 preventing translation of the lock latch 228 towards the shutter 222 (i.e., along the direction D2) when the shutter 222 is in the open state by interfering with the rib 400 of the lock latch 228. This prevents the user 206 from accidently/erroneously attempting to translate the lock latch 228 when the shutter 222 is in the open state.

Figure 15:
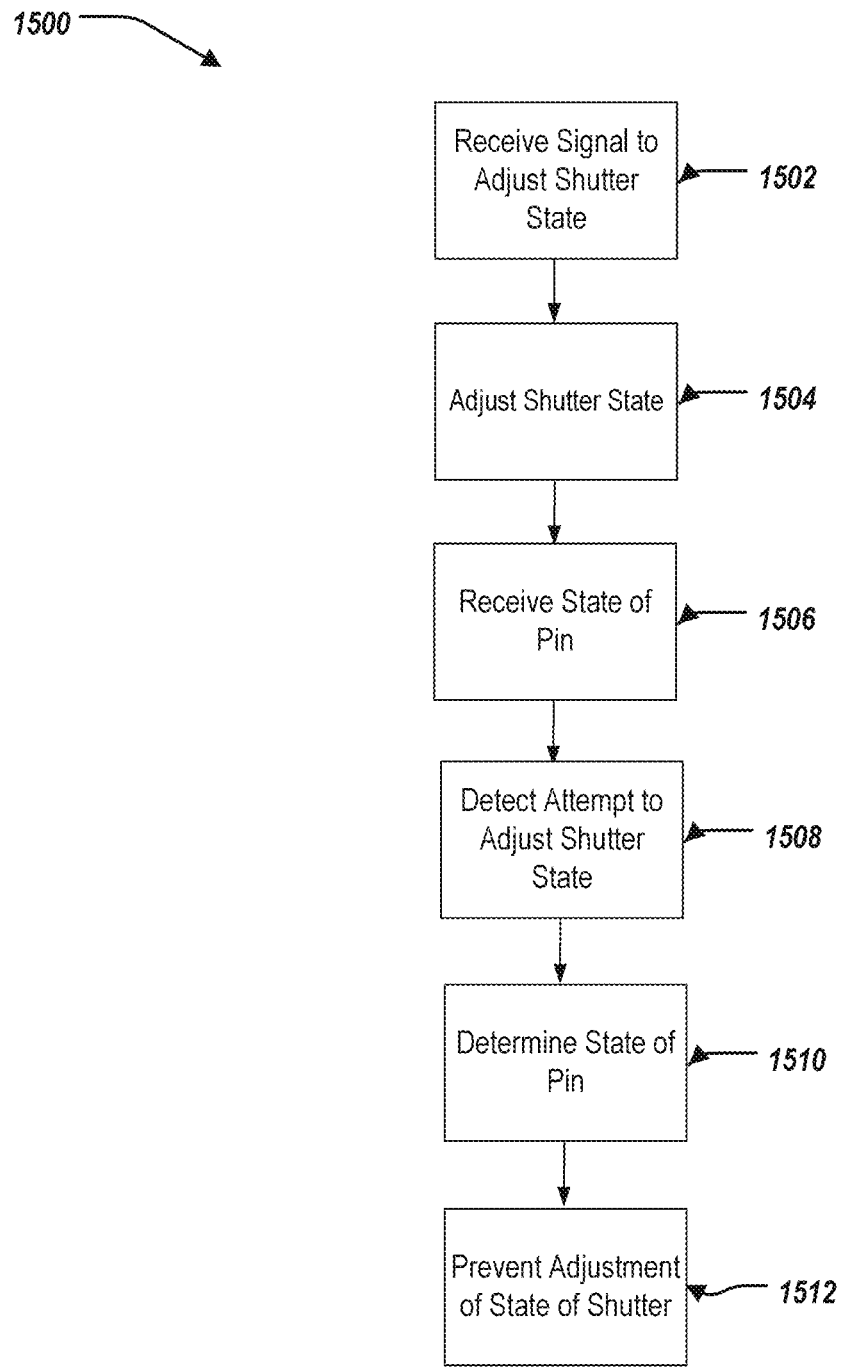
FIGS. 15, 16 illustrate respective methods for controlling the state of the shutter of the camera module of the information handling system.

FIG. 15 illustrates a flowchart depicting selected elements of an embodiment of a method 1500 for controlling a state of a shutter of a camera module of the information handling system. The method 1500 may be performed by the information handling system 100, the information handling system 202, the shutter state control computing module 210, the camera module 216, and/or the motor module 218, and with reference to FIGS. 1-14. It is noted that certain operations described in method 1500 may be optional or may be rearranged in different embodiments.

The shutter state control computing module 210 receives a signal indicating to adjust the shutter 222 from an open state to a closed state to prevent access to the camera 220, at 1502. The shutter state control computing module 210, in response to the signal to indicate to adjust the 222 from an open state to a closed state to prevent access to the camera 220, mechanically adjusts the shutter 222 from the open state to the closed state, at 1504. The shutter state control computing module 210, after adjusting the state of the shutter 222 from the open state to the closed state, receives a signal indicating that a state of the pin 226 indicates that the lock latch 228 is engaged with the shutter 222 to mechanically interfere with movement of the shutter 222 from the closed state to the open state, at 1506. The shutter state control computing module 210 can detect an attempt to adjust the state of the shutter 22 to the open state from the closed state while the lock late 228 is engaged with the shutter 222, at 1508. The shutter state control computing module 210, in response to detecting the attempt to adjust the state of the shutter 222 to the open state from the closed state while the lock latch is engaged with the shutter 222 and based on the state of the pin 226, prevents mechanical adjustment of the state of the shutter 222 to the open state from the closed state, at 1510.

Figure 16:
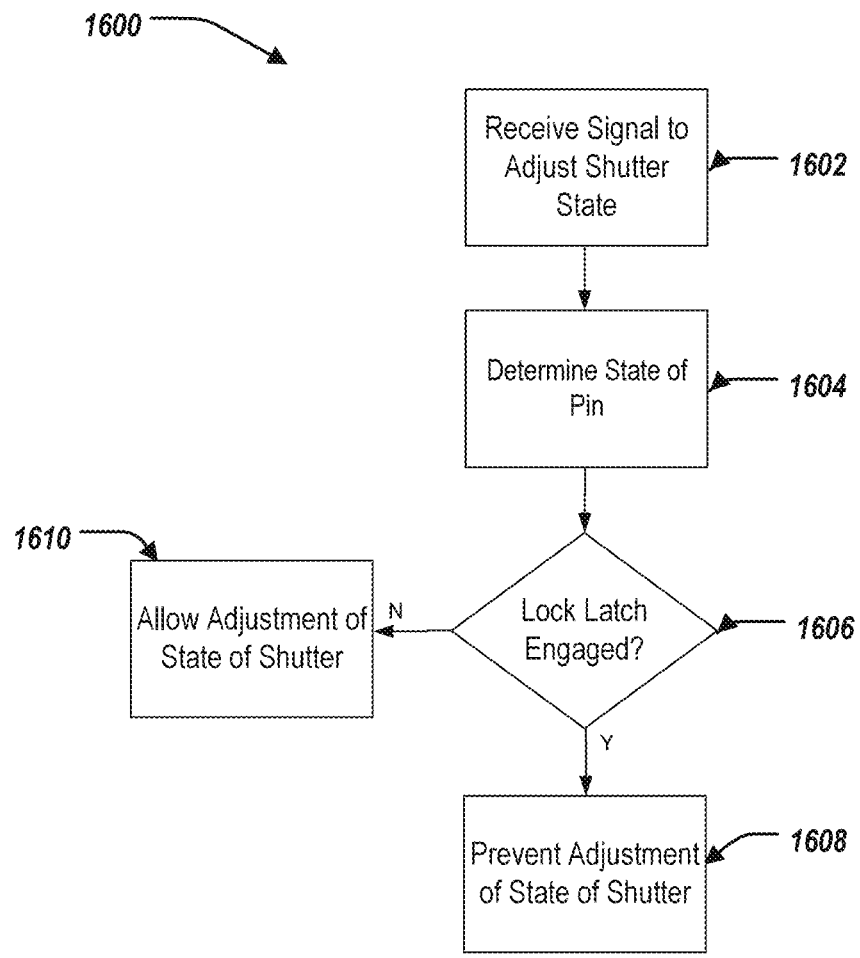

FIG. 16 illustrates a flowchart depicting selected elements of an embodiment of a method 1600 for controlling a state of a shutter of a camera module of the information handling system. The method 1600 may be performed by the information handling system 100, the information handling system 202, the shutter state control computing module 210, the camera module 216, and/or the motor module 218, and with reference to FIGS. 1-14. It is noted that certain operations described in method 1600 may be optional or may be rearranged in different embodiments The shutter state control computing module 210 receives a signal indicating to adjust the shutter 222 from a closed state to an open state, at 1602. The shutter state control computing module 210 accesses the pin 226 to determine the state of the pin 226, at 1604. The shutter state control computing module 210 determines whether the state of the pin 226 indicates the lock latch 228 is engaged with the shutter 222, at 1606. If the shutter state control computing module 210 determines that the state of the pin 226 indicates the lock latch 228 is engaged with the shutter 222, the shutter state control computing module 210 prevents the motor module 218 from adjusting the positioning of the shutter 222, at 1608. If the shutter state control computing module 210 determines that the state of the pin 226 indicates that the lock latch 228 is disengaged with the shutter 222, the shutter state control computing module 210 allows the motor module 218 to adjust the positioning of the shutter 222 from the closed state to the open state, at 1610.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method of controlling states of a shutter, the method comprising:
   receiving a signal indicating to adjust a shutter of a camera module of an information handling system from an open state to a closed state to prevent access to a camera of the camera module;
   in response to the signal, mechanically adjusting the shutter of the camera module from the open state to the closed state;
   after adjusting the state of the shutter of the camera module from the open state to the closed state, receiving a signal indicating that a state of a pin indicates that a lock latch is engaged with the shutter to mechanically interfere with movement of the shutter from the closed state to the open state, the pin in contact with the shutter;
   detecting an attempt to adjust the state of the shutter of the camera module to the open state from the closed state while the lock latch is engaged with the shutter;
   in response to detecting the attempt to adjust the state of the shutter of the camera module to the open state from the closed state while the lock latch is engaged with the shutter and based on the state of the pin, preventing mechanical adjustment of the state of the shutter of the camera module to the open state from the closed state.

2. The method of claim 1, further comprising in response to detecting the attempt to adjust the state of the shutter of the camera module to the open state from the closed state while the lock latch is engaged with the shutter:
   providing a notification to a display device of the information handling system indicating the attempt to adjust the state of the shutter of the camera module to the open state from the closed state.

3. The method of claim 1, wherein receiving the signal indicating to adjust the shutter of the camera module further comprises receiving the signal from a computer-implemented application executing on the information handling system.

4. The method of claim 1, wherein receiving the signal indicating to adjust the shutter of the camera module further comprises receiving the signal in response to a keypress of a keyboard input device of the information handling system.

5. The method of claim 1, wherein the attempt to adjust the state of the shutter of the camera module to the open state from the closed state while the lock latch is engaged with the shutter includes an unauthorized attempt to adjust the state of the shutter of the camera module to the open state from the closed state while the lock latch is engaged with the shutter from an authorized source.

6. The method of claim 1, wherein mechanically adjusting the shutter of the camera module from the open state to the closed state further comprises:
   providing a signal to a motor to mechanically adjust a positioning of the shutter within the camera module from the open state to the closed state;
   receiving a signal from a sensor detecting a positioning of the shutter within the camera module to indicate that the shutter is in the closed state; and
   in response to the signal from the sensor detecting the positioning of the shutter within the camera module to indicate that the shutter is in the closed state, providing a signal to the motor to cease adjusting the positioning of the shutter with the camera module.

7. The method of claim 1, further comprising:
   receiving a signal indicating to adjust the shutter of the camera module of the information handling system from the closed state to the open state to provide access to the camera module;
   determining that the state of the pin indicates that the lock latch is disengaged from the shutter; and
   in response to determining that the state of the pin indicates that the lock latch is disengaged with the shutter, mechanically adjusting the shutter of the camera module from the closed state to the open state.

8. A system for controlling states of a shutter, the system comprising:
   a camera module including a camera and a shutter;
   a lock latch;
   a pin in contact with the lock latch;

a processor having access to memory media storing instructions executable by the processor to perform operations comprising, comprising:
  receiving a signal indicating to adjust the shutter of the camera module of an information handling system from an open state to a closed state to prevent access to a camera of the camera module;
  in response to the signal, mechanically adjusting the shutter of the camera module from the open state to the closed state;
  after adjusting the state of the shutter of the camera module from the open state to the closed state, receiving a signal indicating that a state of the pin indicates that the lock latch is engaged with the shutter to mechanically interfere with movement of the shutter from the closed state to the open state;
  detecting an attempt to adjust the state of the shutter of the camera module to the open state from the closed state while the lock latch is engaged with the shutter;
  in response to detecting the attempt to adjust the state of the shutter of the camera module to the open state from the closed state while the lock latch is engaged with the shutter and based on the state of the pin, preventing mechanical adjustment of the state of the shutter of the camera module to the open state from the closed state.

9. The system of claim 8, the operations further comprising in response to detecting the attempt to adjust the state of the shutter of the camera module to the open state from the closed state while the lock latch is engaged with the shutter:
  providing a notification to a display device of the information handling system indicating the attempt to adjust the state of the shutter of the camera module to the open state from the closed state.

10. The system of claim 8, wherein receiving the signal indicating to adjust the shutter of the camera module further comprises receiving the signal from a computer-implemented application executing on the information handling system.

11. The system of claim 8, wherein receiving the signal indicating to adjust the shutter of the camera module further comprises receiving the signal in response to a keypress of a keyboard input device of the information handling system.

12. The system of claim 8, wherein the attempt to adjust the state of the shutter of the camera module to the open state from the closed state while the lock latch is engaged with the shutter includes an unauthorized attempt to adjust the state of the shutter of the camera module to the open state from the closed state while the lock latch is engaged with the shutter from an authorized source.

13. The system of claim 8, wherein mechanically adjusting the shutter of the camera module from the open state to the closed state further comprises:
  providing a signal to a motor to mechanically adjust a positioning of the shutter within the camera module from the open state to the closed state;
  receiving a signal from a sensor detecting a positioning of the shutter within the camera module to indicate that the shutter is in the closed state; and
  in response to the signal from the sensor detecting the positioning of the shutter within the camera module to indicate that the shutter is in the closed state, providing a signal to the motor to cease adjusting the positioning of the shutter with the camera module.

14. The system of claim 8, the operations further comprising:
  receiving a signal indicating to adjust the shutter of the camera module of the information handling system from the closed state to the open state to provide access to the camera module;
  determining that the state of the pin indicates that the lock latch is disengaged from the shutter; and
  in response to determining that the state of the pin indicates that the lock latch is disengaged with the shutter, mechanically adjusting the shutter of the camera module from the closed state to the open state.

15. A non-transitory computer-readable medium storing software comprising instructions executable by one or more computers which, upon such execution, cause the one or more computers to perform operations comprising:
  receiving a signal indicating to adjust a shutter of a camera module of an information handling system from an open state to a closed state to prevent access to a camera of the camera module;
  in response to the signal, mechanically adjusting the shutter of the camera module from the open state to the closed state;
  after adjusting the state of the shutter of the camera module from the open state to the closed state, receiving a signal indicating that a state of a pin indicates that a lock latch is engaged with the shutter to mechanically interfere with movement of the shutter from the closed state to the open state, the pin in contact with the shutter;
  detecting an attempt to adjust the state of the shutter of the camera module to the open state from the closed state while the lock latch is engaged with the shutter;
  in response to detecting the attempt to adjust the state of the shutter of the camera module to the open state from the closed state while the lock latch is engaged with the shutter and based on the state of the pin, preventing mechanical adjustment of the state of the shutter of the camera module to the open state from the closed state.

16. The non-transitory computer-readable medium of claim 15, the operations further comprising in response to detecting the attempt to adjust the state of the shutter of the camera module to the open state from the closed state while the lock latch is engaged with the shutter:
  providing a notification to a display device of the information handling system indicating the attempt to adjust the state of the shutter of the camera module to the open state from the closed state.

17. The non-transitory computer-readable medium of claim 15, wherein receiving the signal indicating to adjust the shutter of the camera module further comprises receiving the signal from a computer-implemented application executing on the information handling system.

18. The non-transitory computer-readable medium of claim 15, wherein receiving the signal indicating to adjust the shutter of the camera module further comprises receiving the signal in response to a keypress of a keyboard input device of the information handling system.

19. The non-transitory computer-readable medium of claim 15, wherein the attempt to adjust the state of the shutter of the camera module to the open state from the closed state while the lock latch is engaged with the shutter includes an unauthorized attempt to adjust the state of the shutter of the camera module to the open state from the closed state while the lock latch is engaged with the shutter from an authorized source.

20. The non-transitory computer-readable medium of claim 15, wherein mechanically adjusting the shutter of the camera module from the open state to the closed state further comprises:
- providing a signal to a motor to mechanically adjust a positioning of the shutter within the camera module from the open state to the closed state;
- receiving a signal from a sensor detecting a positioning of the shutter within the camera module to indicate that the shutter is in the closed state; and
- in response to the signal from the sensor detecting the positioning of the shutter within the camera module to indicate that the shutter is in the closed state, providing a signal to the motor to cease adjusting the positioning of the shutter with the camera module.

* * * * *